United States Patent
Peterson et al.

(10) Patent No.: US 11,634,077 B2
(45) Date of Patent: Apr. 25, 2023

(54) POWERFOLD ACTUATOR FOR EXTERIOR MIRROR

(71) Applicant: Magna Mirrors of America, Inc., Holland, MI (US)

(72) Inventors: Kenneth C. Peterson, Ada, MI (US); Mitchell J. Wesley, Grand Rapids, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 17/814,574

(22) Filed: Jul. 25, 2022

(65) Prior Publication Data

US 2022/0355736 A1 Nov. 10, 2022

Related U.S. Application Data

(63) Continuation of application No. 17/249,034, filed on Feb. 18, 2021, now Pat. No. 11,396,264.

(60) Provisional application No. 62/978,850, filed on Feb. 20, 2020.

(51) Int. Cl.
*B60R 1/074* (2006.01)
*G02B 7/182* (2021.01)

(52) U.S. Cl.
CPC .............. *B60R 1/074* (2013.01); *G02B 7/182* (2013.01)

(58) Field of Classification Search
CPC ................................ B60R 1/074; G02B 7/182
USPC ................................................. 359/841, 877
See application file for complete search history.

(56) References Cited

U.S. PATENT DOCUMENTS

| | | | |
|---|---|---|---|
| 5,636,071 A | 6/1997 | Mochizuki et al. |
| 6,022,113 A | 2/2000 | Stolpe et al. |
| 6,130,514 A | 10/2000 | Oesterholt et al. |
| 6,133,704 A | 10/2000 | Yoshida et al. |
| 6,322,721 B1 | 11/2001 | van de Loo |
| 6,390,630 B1 | 5/2002 | Ochs |
| 6,578,973 B2 | 6/2003 | Apfelbeck |
| 6,874,896 B2 | 4/2005 | Yoshida |
| 6,926,414 B2 | 8/2005 | Van Stiphout |
| 6,981,774 B2 | 1/2006 | Dumont et al. |
| 7,008,068 B2 | 3/2006 | Yoshida |

(Continued)

FOREIGN PATENT DOCUMENTS

| | | |
|---|---|---|
| CN | 1938179 A | 3/2007 |
| JP | 1199556 | 10/2008 |
| WO | 2005113290 A1 | 12/2005 |

*Primary Examiner* — Ricky D Shafer
(74) *Attorney, Agent, or Firm* — Honigman LLP

(57) ABSTRACT

A vehicular exterior rearview mirror assembly includes a mirror head pivotally mounted at a mounting arm configured for attachment at a side of a vehicle. The mirror head includes a reflective element. A powerfold actuator is operable to pivot the mirror head relative to the mounting arm between at least a folded position and a drive position. The powerfold actuator includes a primary detent that is engaged to maintain the mirror head at the drive position when the mirror head is pivoted via the powerfold actuator to the drive position. The powerfold actuator includes a secondary detent. Following pivoting via the powerfold actuator of the mirror head to the folded position, when the mirror head is manually pivoted from the folded position to the drive position, the primary detent is disengaged and the secondary detent is engaged to maintain the mirror head at the drive position.

25 Claims, 23 Drawing Sheets

(56) References Cited

U.S. PATENT DOCUMENTS

| | | |
|---|---|---|
| 7,070,287 B2 | 7/2006 | Foote et al. |
| 7,171,726 B2 | 2/2007 | Kleissen et al. |
| 7,255,451 B2 | 8/2007 | McCabe et al. |
| 7,289,037 B2 | 10/2007 | Uken et al. |
| 7,360,932 B2 | 4/2008 | Uken et al. |
| 7,374,299 B2 | 5/2008 | Brouwer et al. |
| 7,392,567 B2 | 7/2008 | Brouwer |
| 7,452,088 B2 | 11/2008 | Brester et al. |
| 7,490,945 B2 | 2/2009 | Proctor |
| 7,533,997 B2 | 5/2009 | Onuki |
| 7,543,949 B2 | 6/2009 | van den Brink et al. |
| 7,547,855 B2 | 6/2009 | Brouwer et al. |
| 7,572,018 B2 | 8/2009 | Errando Smet et al. |
| 7,628,499 B2 | 12/2009 | Brouwer et al. |
| 7,744,229 B2 | 6/2010 | Oehmann et al. |
| 7,836,553 B2 | 11/2010 | Brouwer et al. |
| 7,887,202 B1 | 2/2011 | Peterson |
| 3,049,640 A1 | 11/2011 | Uken et al. |
| 8,123,369 B2 * | 2/2012 | Itoh .................. B60R 1/074 359/872 |
| 8,129,642 B2 | 3/2012 | Brouwer et al. |
| 8,201,305 B2 | 6/2012 | Brouwer et al. |
| 8,277,059 B2 | 10/2012 | McCabe et al. |
| 8,313,202 B2 | 11/2012 | van Stiphout et al. |
| 8,366,284 B2 | 2/2013 | Flynn et al. |
| 8,508,831 B2 | 8/2013 | De Wind et al. |
| 8,529,108 B2 | 9/2013 | Uken et al. |
| 8,628,200 B2 | 1/2014 | van Stiphout et al. |
| 8,730,553 B2 | 5/2014 | De Wind et al. |
| 8,915,601 B2 | 12/2014 | Foote et al. |
| 9,033,526 B2 | 5/2015 | Schuurmans et al. |
| 9,045,088 B2 | 6/2015 | Sakata |
| 9,067,541 B2 | 6/2015 | Sobecki et al. |
| 9,174,578 B2 | 11/2015 | Uken et al. |
| 9,242,606 B2 | 1/2016 | Mambourg |
| 9,346,403 B2 | 5/2016 | Uken et al. |
| 9,487,142 B2 | 11/2016 | Sobecki et al. |
| 9,598,016 B2 | 3/2017 | Blank et al. |
| 9,758,100 B2 | 9/2017 | Mendoza Vicioso et al. |
| 9,827,913 B2 | 11/2017 | De Wind et al. |
| 9,987,987 B2 | 6/2018 | van Stiphout et al. |
| 10,046,704 B2 * | 8/2018 | Vicioso ................. B60R 1/0612 |
| 10,077,001 B2 * | 9/2018 | Casals .................... B60R 1/074 |
| 10,099,618 B2 | 10/2018 | Foote et al. |
| 10,940,801 B1 | 3/2021 | Harris et al. |
| 11,173,843 B2 | 11/2021 | Peterson et al. |
| 11,214,198 B2 | 1/2022 | Harris et al. |
| 11,396,264 B2 | 7/2022 | Peterson et al. |
| 2002/0135905 A1 | 9/2002 | Yoshida |
| 2003/0218812 A1 | 11/2003 | Foote et al. |
| 2004/0196578 A1 | 10/2004 | Dumont et al. |
| 2004/0218296 A1 | 11/2004 | Van Stiphout |
| 2005/0000058 A1 | 1/2005 | Kleissen et al. |
| 2005/0134979 A1 | 6/2005 | Yoshida |
| 2005/0141111 A1 | 6/2005 | Yoshida |
| 2006/0103957 A1 | 5/2006 | Olijnyk et al. |
| 2006/0274442 A1 | 12/2006 | Brouwer et al. |
| 2007/0029179 A1 | 2/2007 | Brouwer et al. |
| 2007/0084707 A1 | 4/2007 | van den Brink et al. |
| 2007/0211356 A1 | 9/2007 | Brester et al. |
| 2008/0168623 A1 | 7/2008 | Brouwer et al. |
| 2009/0237820 A1 | 9/2009 | McCabe et al. |
| 2009/0303625 A1 | 12/2009 | van Stiphout et al. |
| 2010/0238570 A1 | 9/2010 | Reedman et al. |
| 2010/0275411 A1 | 11/2010 | Brouwer |
| 2012/0067497 A1 | 3/2012 | Hansel et al. |
| 2013/0321941 A1 | 12/2013 | van Stiphout et al. |
| 2017/0088054 A1 | 3/2017 | Casals et al. |
| 2018/0345862 A1 | 12/2018 | van Stiphout |
| 2019/0092241 A1 * | 3/2019 | Fujisaki .................. B60R 1/074 |
| 2020/0223364 A1 | 7/2020 | Peterson et al. |
| 2021/0261053 A1 | 8/2021 | Peterson et al. |

* cited by examiner

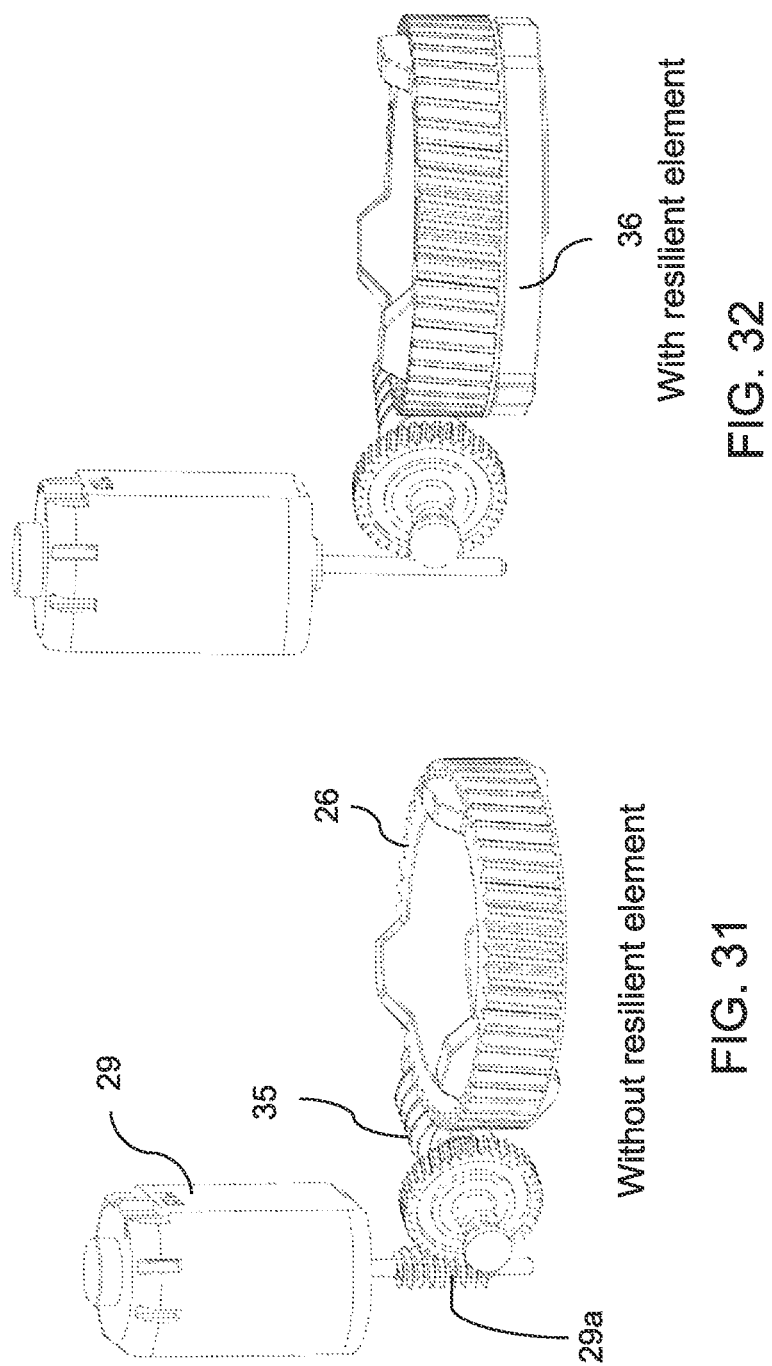

US 11,634,077 B2

POWERFOLD ACTUATOR FOR EXTERIOR MIRROR

CROSS REFERENCE TO RELATED APPLICATIONS

The present application is a continuation of U.S. patent application Ser. No. 17/249,034, filed Feb. 18, 2021, now U.S. Pat. No. 11,396,264, which claims the filing benefits of U.S. provisional application Ser. No. 62/978,850, filed Feb. 20, 2020, which is hereby incorporated herein by reference in its entirety.

FIELD OF THE INVENTION

The present invention relates generally to the field of exterior rearview mirror assemblies for vehicles and, more particularly, to the field of powerfold exterior rearview mirror assemblies.

BACKGROUND OF THE INVENTION

It is known to provide an automotive exterior rearview mirror assembly that includes a foldable mirror assembly, such as a powerfold mirror where the mirror head is pivotable via an actuator between a drive or use position and a folded or park position.

SUMMARY OF THE INVENTION

The present invention provides a rearview mirror assembly (such as an exterior mirror assembly mounted at a side of an equipped vehicle) that includes a powerfold actuator system to pivot the mirror head of the mirror assembly between a drive or use position and a folded or park position responsive to a user input. The powerfold actuator includes a primary detent assembly that functions to retain the mirror head at the drive position, and also includes a separate secondary detent assembly that functions to retain the mirror head at the drive position when the mirror head, after powered folding to the folded position, is manually pivoted from the folded position to the drive position. During operation of the powerfold actuator, the actuator functions to lift the mirror head relative to the mounting base or arm (at the vehicle) so that there are reduced forces and reduced friction at the cut line seal that is disposed between the mirror head and the mounting arm. The actuator includes a flexible or resilient tab that protrudes radially outward from the output gear to engage a tab at the housing portion to limit rotation of the output gear relative to the housing portion in one direction.

These and other objects, advantages, purposes and features of the present invention will become apparent upon review of the following specification in conjunction with the drawings.

BRIEF DESCRIPTION OF THE DRAWINGS

FIG. 31 is a perspective view of the drive motor and drive gear, shown without the resilient element at the drive gear;

FIG. 32 is another perspective view of the drive motor and drive gear, shown with the resilient element at the drive gear;

DESCRIPTION OF THE PREFERRED EMBODIMENTS

Figure 1:
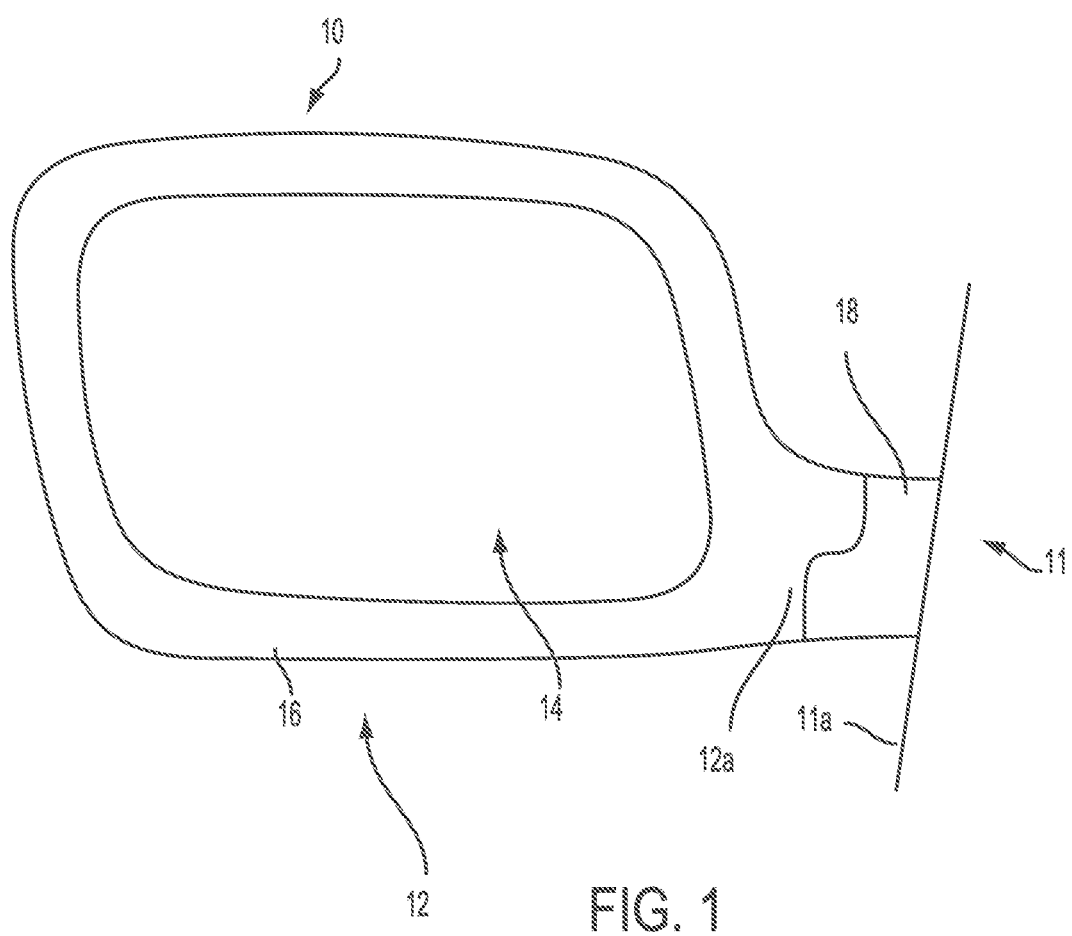
FIG. 1 is a perspective view of an exterior rearview mirror assembly in accordance with the present invention.

Referring now to the drawings and the illustrative embodiments depicted therein, an exterior rearview mirror assembly 10 for a vehicle 11 includes a mirror head 12 that includes a mirror reflective element 14 received in and/or supported at or by a mirror shell or casing 16 of the mirror head portion 12 (FIG. 1). The mirror head portion 12 includes a mounting portion 12a that is pivotally or movably mounted to a mounting arm or base or portion 18. The mirror assembly 10 comprises a powerfold mirror (where the mirror head portion may be pivoted via an actuator assembly or adjustment device), and may comprise a breakaway mirror (where the mirror head portion may be manually pivoted about the mounting arm or base). The mounting arm or base 18 of mirror assembly 10 is mounted at the side 11*a* of a host or subject vehicle 11, with the reflective element 14 providing a rearward field of view along the respective side of the vehicle to the driver of the vehicle, as discussed below.

Figure 3:
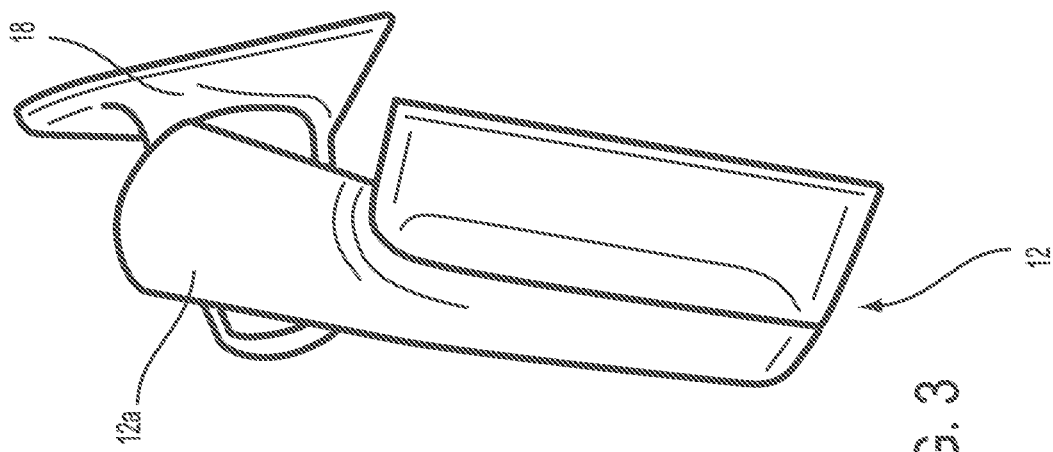
FIG. 3 is a top plan view of the exterior mirror assembly, with the mirror head pivoted to a folded or non-use position.
Figure 2:
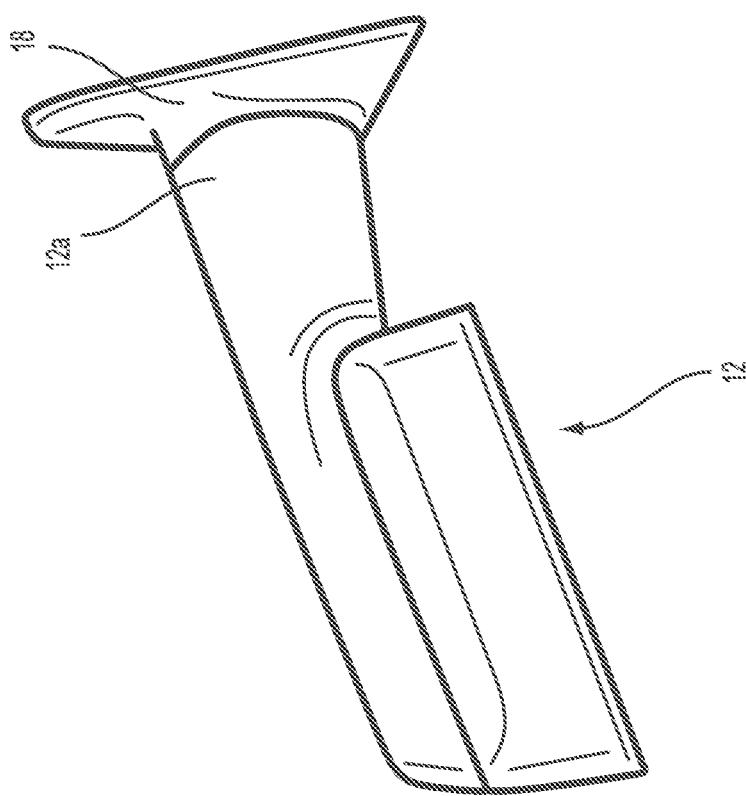
FIG. 2 is a top plan view of the exterior mirror assembly, with the mirror head pivoted to an drive or use position.
Figure 4:
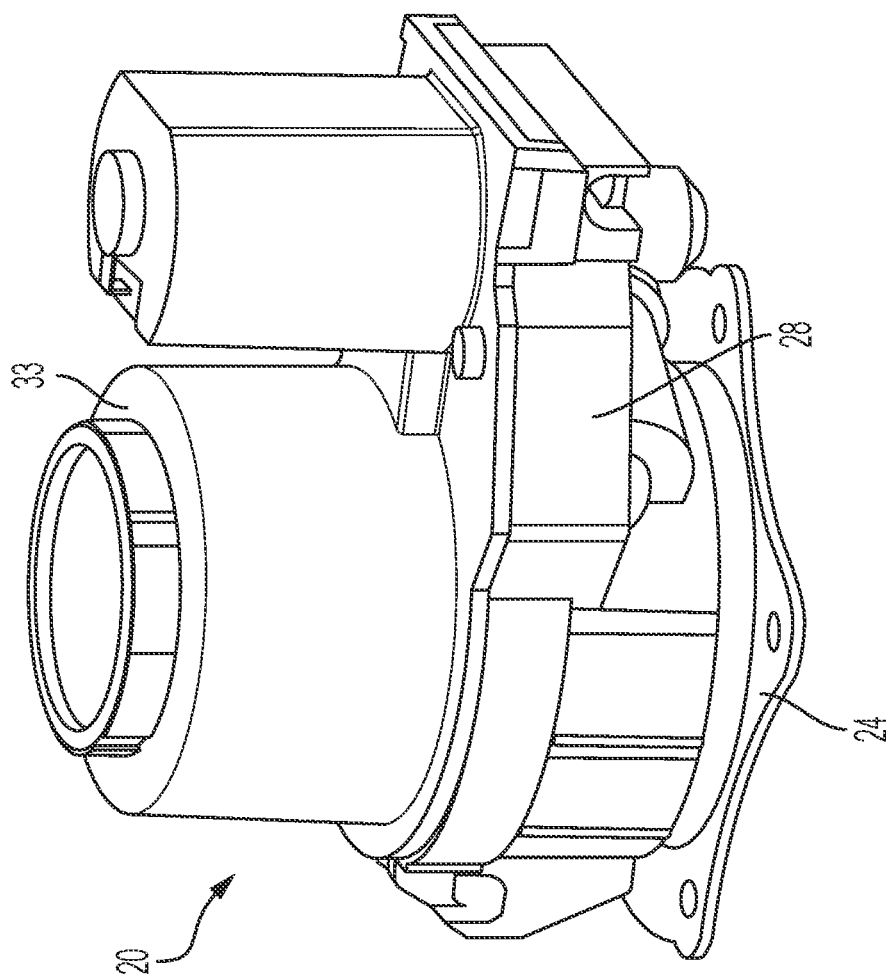
FIGS. 4-9 are views of an actuator of the exterior mirror assembly of FIGS. 1-3.
Figure 5:
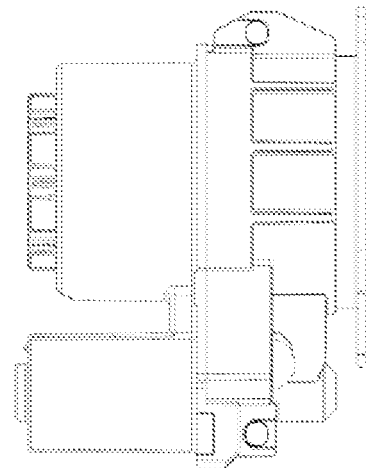
Figure 6:
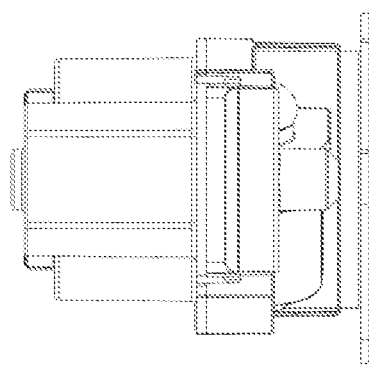
Figure 7:
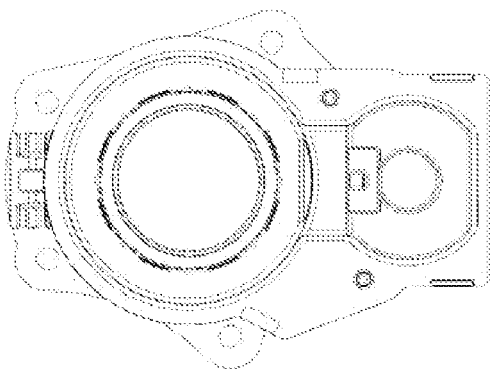
Figure 8:
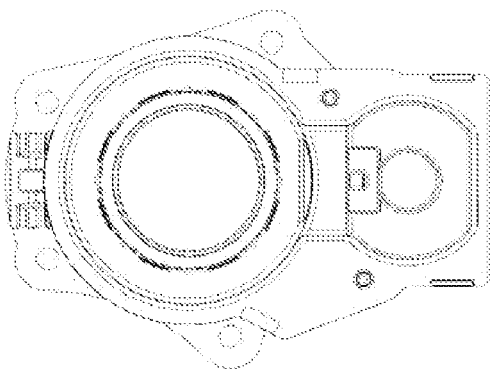
Figure 9:
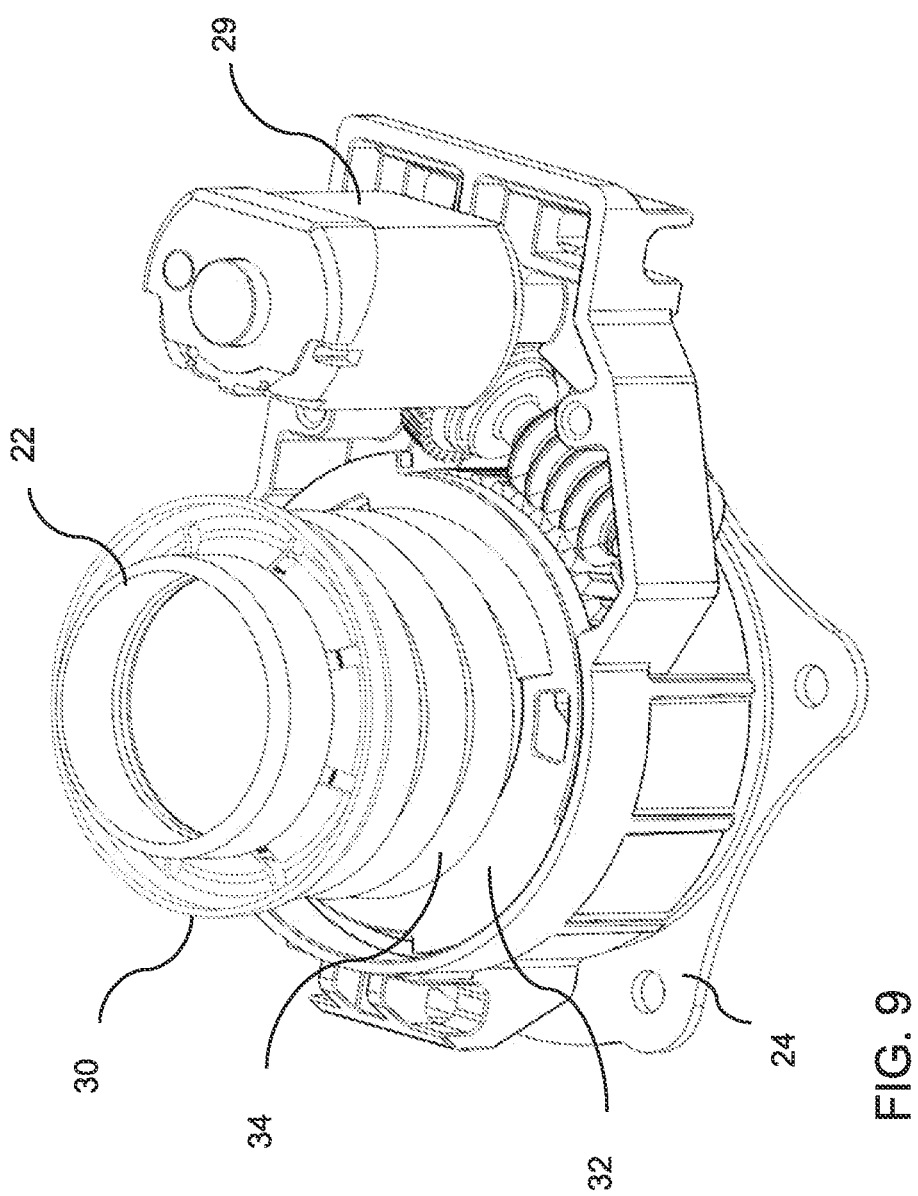
Figure 10:
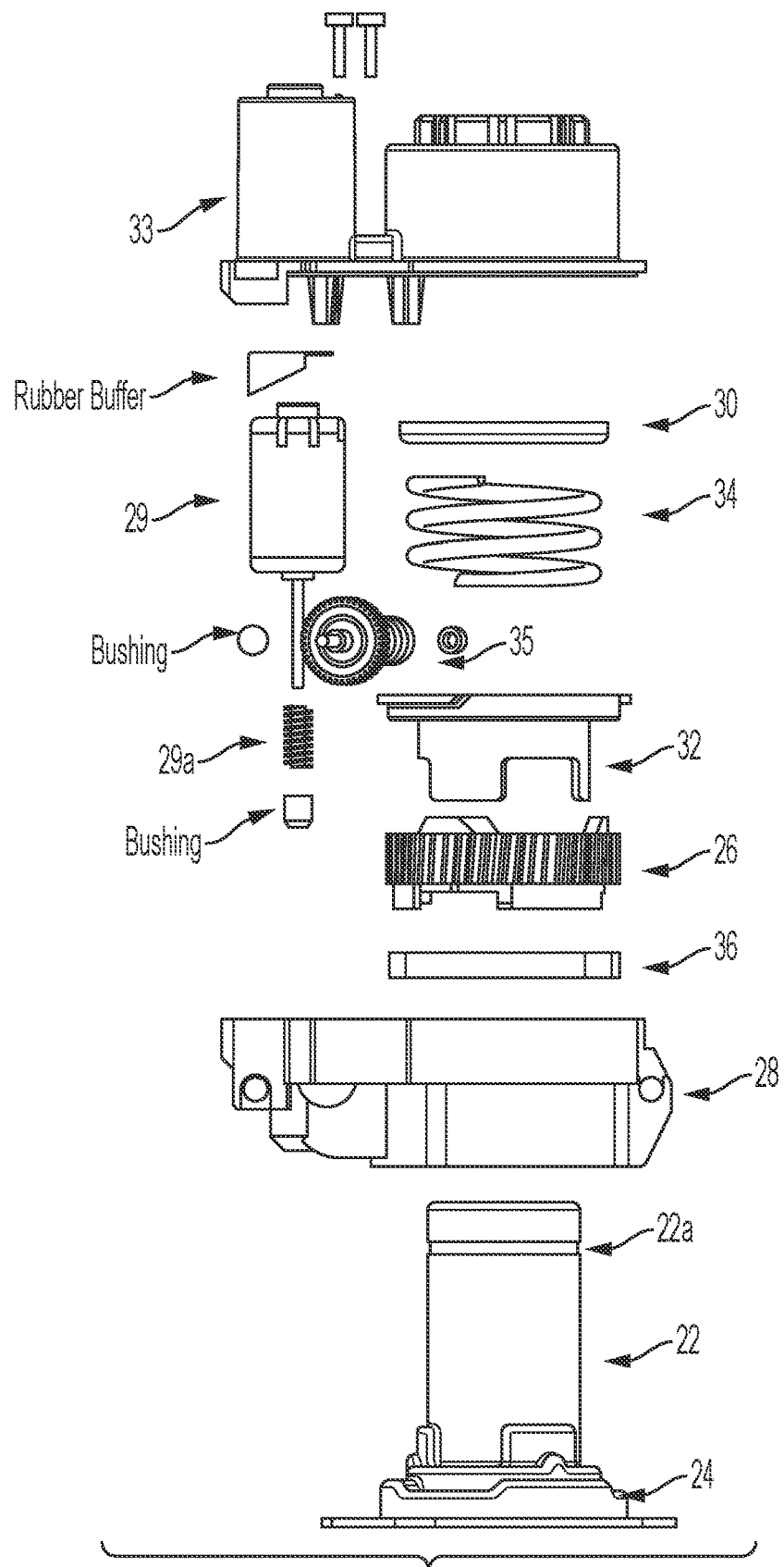
FIG. 10 is an exploded view of the actuator.
Figure 11A:
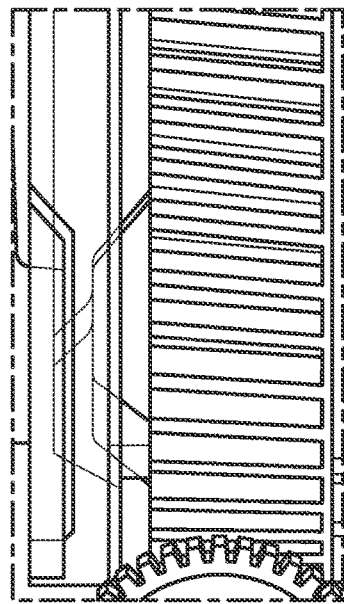
FIG. 11A is an enlarged view of the area A in FIG. 11.
Figure 11:
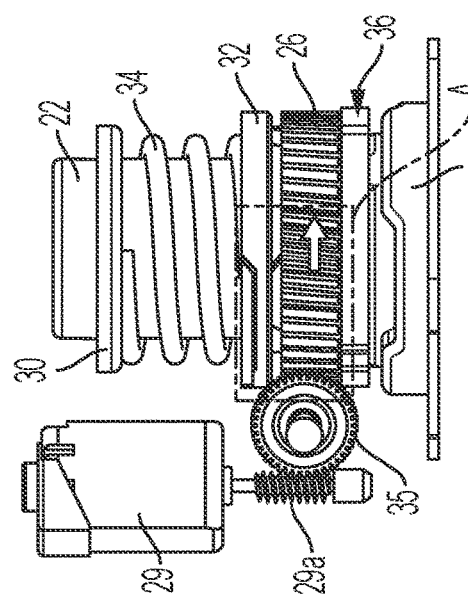
FIG. 11 is a side view of the actuator, shown with the lower housing portion removed.
Figure 12:
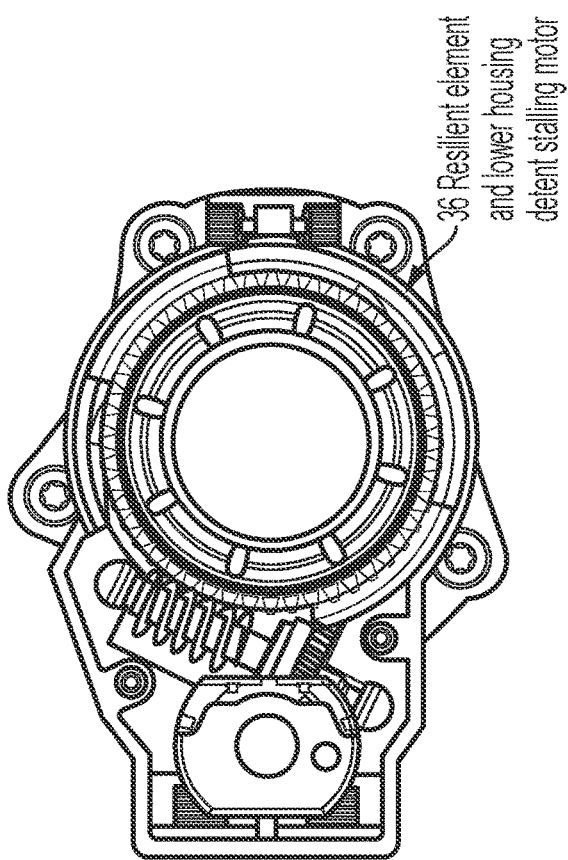
FIG. 12 is a top view of the actuator of FIG. 11.

The mirror assembly comprises a powerfold mirror assembly that includes an actuator 20 that is operable to pivot the mirror head 12 (comprising the mirror casing 16 and reflective element 14) relative to the mounting arm or base 18. The actuator operates, responsive to a user input, to pivot the mirror head 12 between a plurality of detent positions, including a user or drive position (FIG. 2) and a folded or park position (FIG. 3). The mirror head is also pivotable manually to either the use or folded position. Optionally, the mirror head may also be pivoted to a fully forward position. A seal may be disposed along the interface between the mounting portion 12*a* of the mirror head 12 and the mounting arm or base 18. The actuator and mirror assembly may utilize aspects of the actuators and mirror assemblies described in U.S. Pat. Nos. 7,887,202 and/or 9,487,142, which are hereby incorporated herein by reference in their entireties. The actuator and mirror assembly may also or otherwise utilize aspects of the actuators and mirror assemblies described in U.S. patent application Ser. No. 16/639,602, filed Aug. 17, 2018 and published Jul. 16, 2020 as U.S. Publication No. US-2020-0223364, which is a 371 national phase filing of PCT Application No. PCT/IB2018/056228, filed Aug. 17, 2018 and published as International Publication No. WO 2019/035078, which claims the filing benefits of U.S. provisional application Ser. No. 62/546,716, filed Aug. 17, 2017, which are all hereby incorporated herein by reference in their entireties.

The mirror assembly may comprise any suitable construction, such as, for example, a mirror assembly with the reflective element being nested in the mirror casing and with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, which are hereby incorporated herein by reference in their entireties), or such as a mirror assembly having a rear substrate of an electro-optic or electrochromic reflective element nested in the mirror casing, and with the front substrate having curved or rounded perimeter edges, or such as a mirror assembly having a single glass substrate reflective element that is disposed at an outer perimeter edge of the mirror casing and with the glass substrate having curved or rounded perimeter edges, or such as a mirror assembly having a reflective element glass substrate that is circumscribed by a perimeter wall of an attachment plate, with no part of the perimeter wall of the attachment plate encroaching or overlapping onto the outermost surface of the glass substrate, such as by utilizing aspects of the mirror assemblies described in U.S. Pat. Nos. 10,099,618; 9,827, 913; 9,598,016; 9,346,403; 9,174,578; 8,915,601; 8,730,553 and/or 8,508,831, which are hereby incorporated herein by reference in their entireties (and with electrochromic and prismatic mirrors of such construction are commercially available from the assignee of this application under the trade name INFINITY™ mirror). In such applications, the mirror reflective element may be adhesively attached at a bracket or attachment plate of the mirror head and may move together and in tandem with the mirror head relative to the mounting arm. The mirror assembly may include an actuator at the mounting arm or mirror head that operates to pivot or adjust the mirror head (and reflective element) relative to the mounting arm and the side of the vehicle at which the mounting arm is attached.

Figure 30:
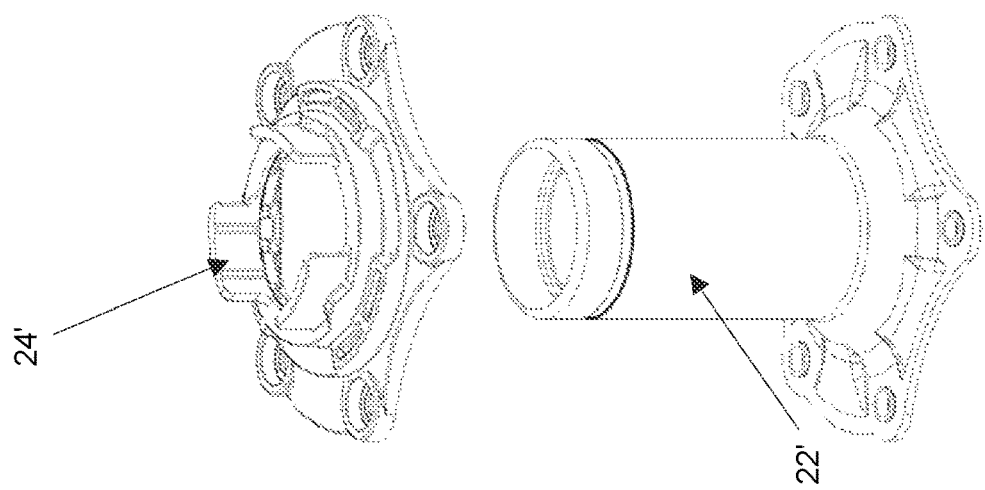
FIG. 30 is another exploded perspective view of the base and pivot post of FIG. 28.
Figure 29:
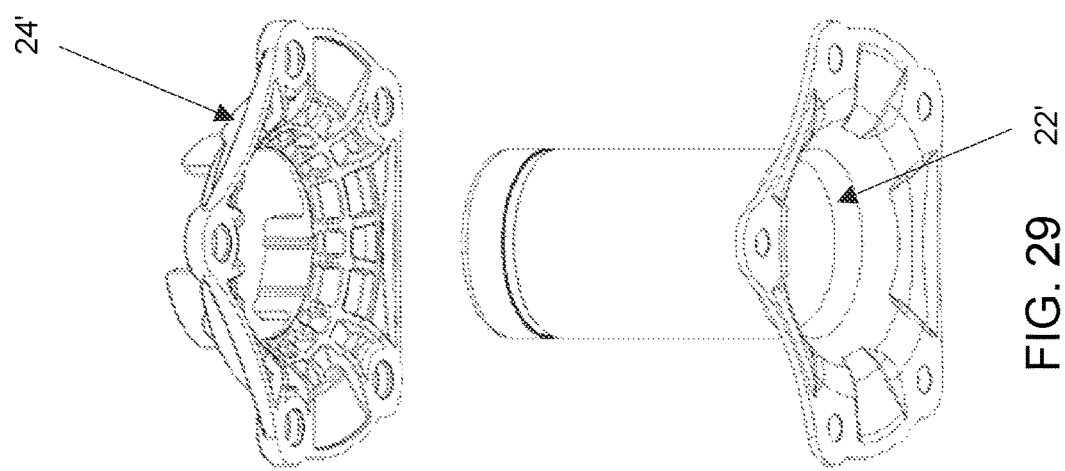
FIG. 29 is an exploded perspective view of the base and pivot post of FIG. 28, shown with the base detached from the pivot post.
Figure 28:
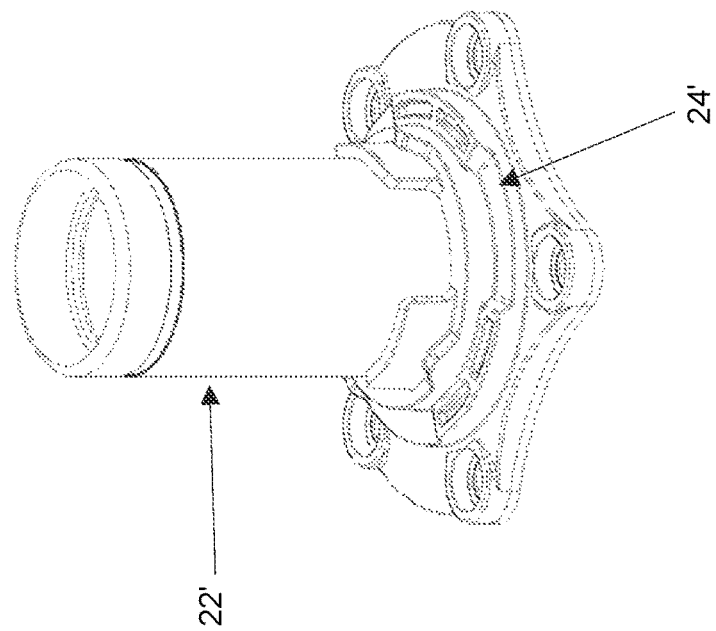
FIG. 28 is a perspective view of another base and pivot post of the actuator.

As shown in FIGS. 4-10, the mirror actuator 20 comprises a pivot assembly that has a base post structure that has a pivot tube or post 22 and base 24 integrated together (or that has a separate base and pivot post joined together, such as discussed below with respect to FIGS. 28-30) with the pivot post providing or defining a pivot axis for the mirror head. The post 22 extends from a base 24 and an output gear 26 is disposed at the bottom of the post and are fixedly disposed at or attached at the mounting base or arm 18. An actuator housing or lower housing or bracket 28 is rotatably disposed at the post and houses a motor 29 and is non-rotatably disposed or attached at the mirror head 12. The post 22 extends from the base 24 and through the output gear 26 and lower housing 28 and through an upper detent element 32, and has a retaining ring 30 affixed at its upper end (whereby the retaining ring may be received at a groove 22*a* of the tube or post). An upper housing portion 33 attaches to the lower housing 28 and encloses the base post, motor, detents and gears. The retainer 30 is rigidly fastened to the post 22, such that the retainer, post and base are effectively a single member or element and provide axial and rotational ground reference for all motions and forces. The upper detent 32 is non-rotatably keyed with the base 24 and post 22 such that the upper detent 32 is non-rotatable relative to the post 22. A resilient element 36 is disposed at a lower part of the output gear 26 and is configured to engage the lower housing to assist in stalling the motor, as discussed below.

The powerfold actuator 20 has enhanced performance and capability (reduced noise, higher torque, lift and turn, double detent, and a larger pivot post hole), having two detent interfaces that become active at different times between primary and secondary detent states. These interfaces are referred to as an upper detent interface and a lower detent interface. The upper detent interface is between the output gear 26 and the upper detent part 32. The lower detent interface is between the lower housing 28 and the base 22. The third interface of importance is referred to as the ramp interface, which is between the output gear 26 and the lower housing 28.

Figure 17:
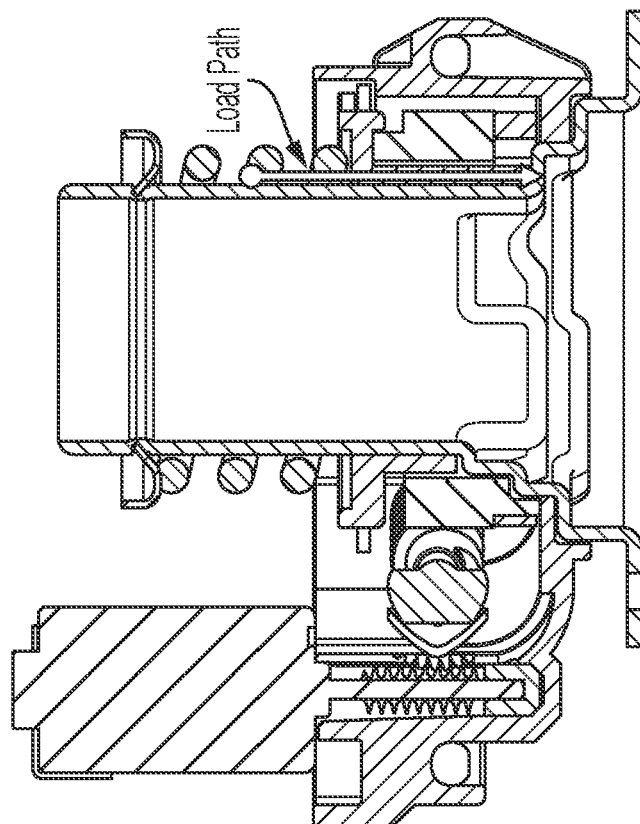
FIG. 17 is another sectional view of the actuator, showing the spring load path directly to the base during electric folding of the mirror.
Figure 16:
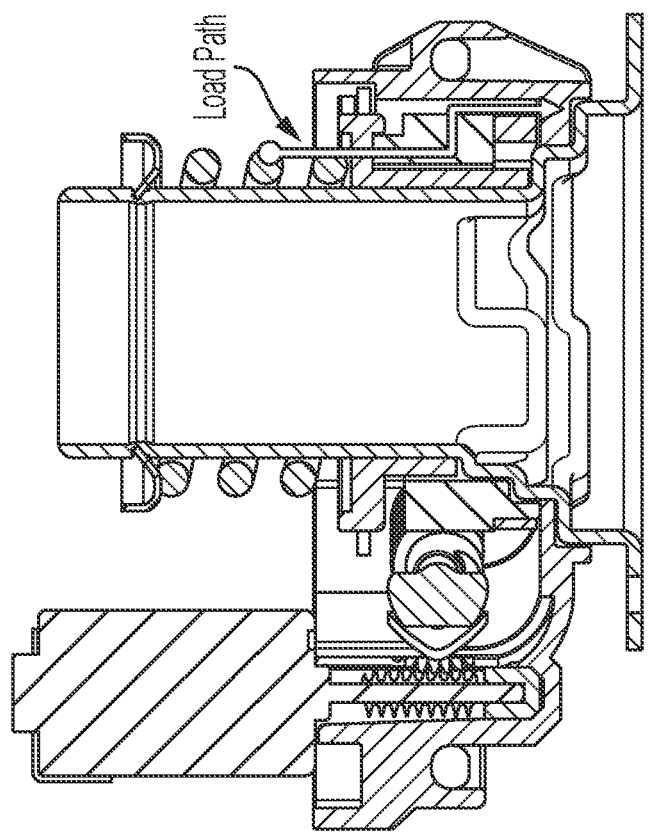
FIG. 16 is a sectional view of the actuator, showing the spring load path through the output gear, lower housing and base when the motor is cinched.

The pivot assembly provides detents to retain the mirror head at the use or drive position or at the folded or park position. A lower surface of the output gear 26 and an upper surface or portion of the lower housing 28 are configured to engage one another and a lower surface or portion of the housing 28 is configured to engage detents at the upper surface of the base 24, while an upper surface or portion of the output gear 26 and a detent surface of the upper detent element 32 are configured to engage one another to retain the mirror head at the drive position. A coil spring or other suitable biasing or urging element 34 provides the primary load and exerts a downward force at the upper detent element 32, which engages the base 24 directly during electric folding (see FIG. 17) or which engages the output gear 26, which engages the lower housing 28, which engages the base 24 when the motor is cinched (see FIG. 16). During operation of the actuator, the actuator bracket or housing 28 (and the motor 29 and mirror head) rotate about the pivot axis (or longitudinal axis of the post), while the output gear 26 and upper detent element 32 (and post 22 and retainer 30) remain fixed relative to the mounting arm 18.

As the housing and mirror head are rotated toward the folded or park position, the housing 28 lifts in relation to the base 24 while turning, and such lifting lifts the mirror head and increases the gap between the mirror head mounting portion and the mounting arm 18 and thus reduces or limits or avoids pressure at the cut line seal (the seal that is disposed between and at the interface of the mirror head mounting portion 12a and the mounting arm 18 and that follows the contour and fills the gap between the mirror head and the base) during pivotal movement of the mirror head.

The motor 29 is actuated to rotatably drive a motor worm gear 29a that rotatably drives a main gear 35 of the housing, which engages the output gear 26 and rotates the housing relative to the output gear until a hard stop is engaged, whereby the motor will stall or stop, with the mirror head retained at the extended or drive position via the detents. The actuator is configured such that a hard stop is provided at the appropriate locations when the mirror head is pivoted via driving of the motor.

The resilient element 36 of the actuator functions to stop the output gear's rotation as it cinches in the drive position. As the output gear begins to cinch, the gear will rotate and lift the upper detent a small amount until the resilient element meets the adjacent detent on the lower housing, limiting or precluding further rotation of the housing relative to the gear and thereby stalling the motor. The lifting of the upper detent transfers the spring load through the lower housing to the base, resulting in enhanced stability for the mirror head in the drive position.

Figure 18:
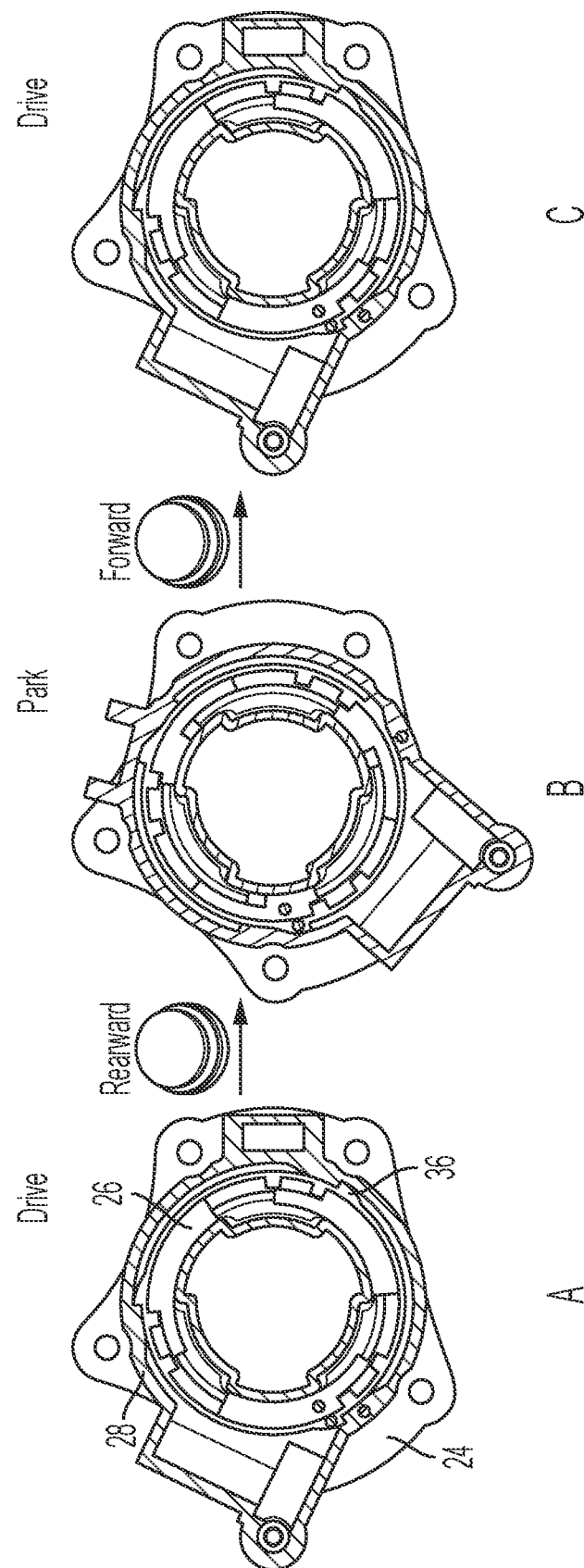
FIG. 18 shows plan views of the actuator at drive and park positions during electric folding of the mirror.
Figure 19:
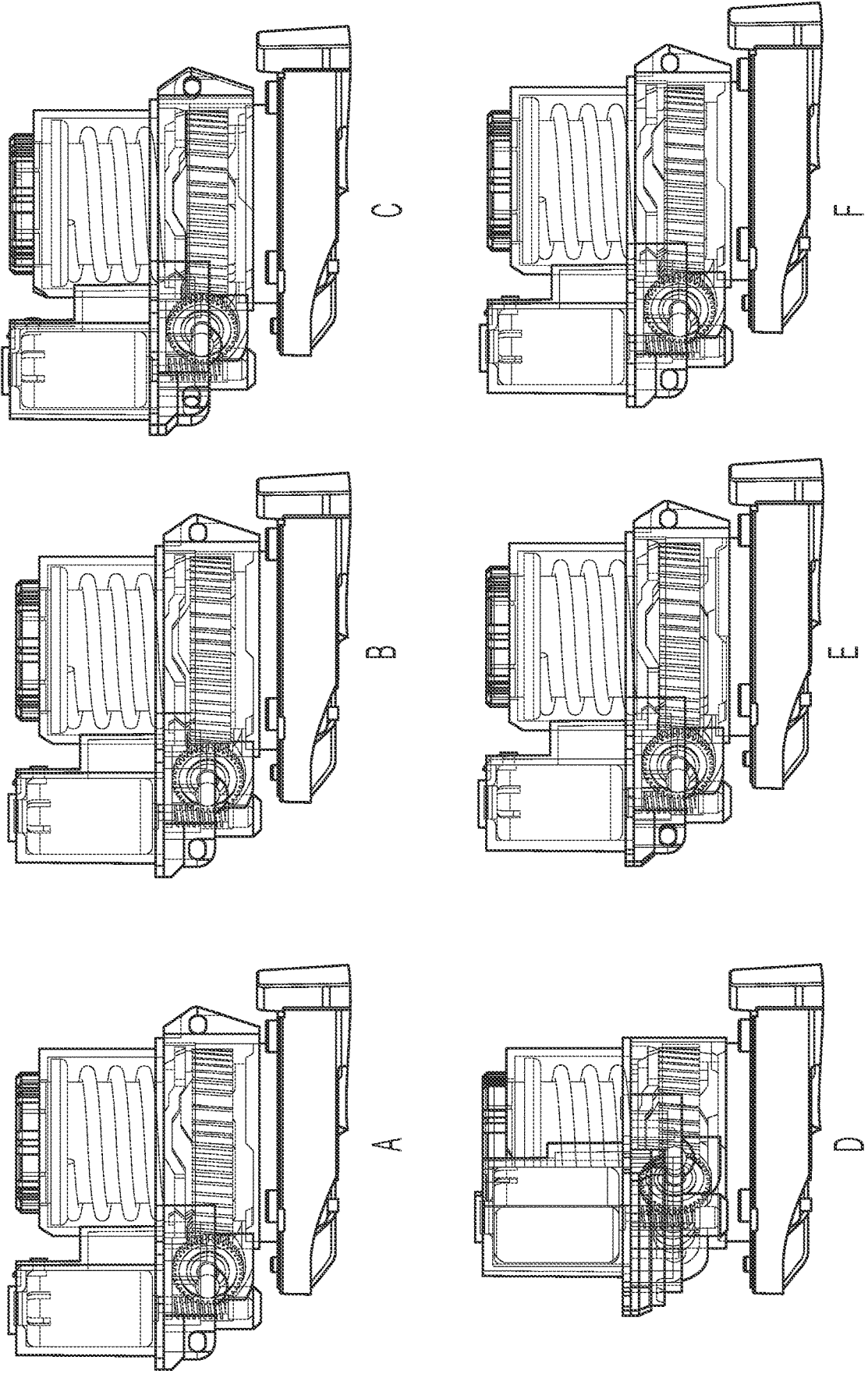
FIG. 19 shows side views of the actuator during electric folding of the mirror.

The pivot assembly provides detents to retain the mirror head at the use position or at the folded position. When the mirror head is in the drive position and in the primary detent state, a part of the upper detent surface of the output gear 26 is disposed at a correspondingly formed first recessed portion of the detent surface of the upper detent element 32, while a part of the lower detent surface of the housing 28 is received in a correspondingly formed recessed portion of the upper detent surface of the base 24. During normal power-fold operation (i.e., no manual pivoting of the mirror head), and such as shown in FIGS. 18 and 19, the actuator begins in the primary drive position (See A in FIG. 18 and A in FIG. 19) and the output gear 26 lifts and rotates into the second or further recessed detent of the upper detent 32 (see B and C in FIG. 19). In particular, and such as can be seen by comparing B and C in FIG. 19, the upper detent surface of the output gear moves upward along the detent surface of the upper detent and nests in a correspondingly formed recess of the upper detent, which begins moving the housing and mirror head upward relative to the mounting arm to reduce load on the cut-line seal between the mirror head and the mounting arm. As the actuator continues to operate, the lower housing 28 rises along the ramped surface of the base to further lift the mirror head upward relative to the mounting arm to reduce load on the cut-line seal between the mirror head and the mounting arm, and the lower housing 28 rotates with respect to the base 22 and the output gear 26 to achieve the park position (see B in FIG. 18 and D in FIG. 19). The lower detent ramped surfaces are designed to allow constant surface contact between the lower housing 28 and the base 22 while in contact. There is no spring load on the lower housing as it climbs the ramps at the base detent surface under normal electric folding conditions. This is due to the lower end of the upper detent part 32 bottoming out on the base 22, which alters the path of the spring load to be through the upper detent part and directly to the base post 22.

Figure 15:
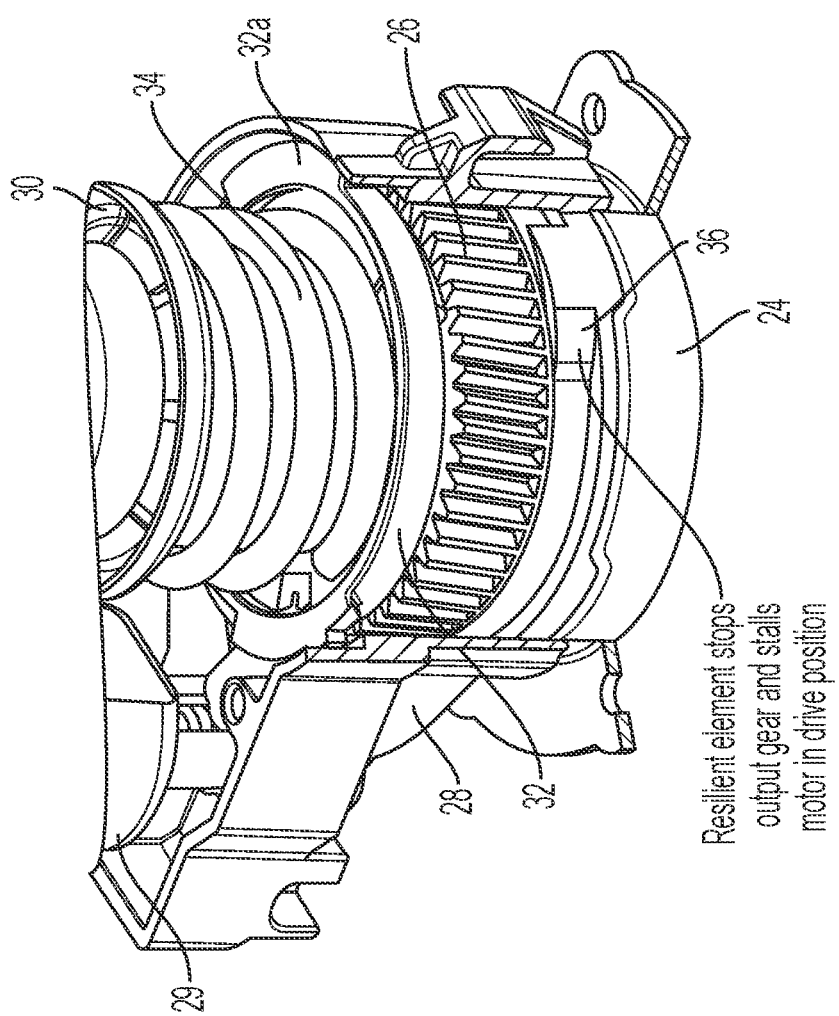
FIG. 15 is a perspective view of part of the actuator, showing the resilient element engaging the lower housing to stall the motor.

FIGS. 18 and 19 show the actuator 20 returning to the primary drive position from the park position (during normal powered or electrical actuator operation). The actuator 20 begins in the park position (see B in FIG. 18 and D in FIG. 19) and, when the motor is electrically powered to pivot the mirror head toward the drive position (see E in FIG. 19), the actuator 20 finds the primary drive position by the lower detent surface of the output gear riding back down the lower detent ramps on the base 24 and becoming cinched between the upper detent 32 and lower detent of the base 24 (see C in FIG. 18 and F in FIG. 19). The upper detent element has a feature or radial protrusion 32a (FIGS. 15 and 27) that has a ramp surface that engages the housing and forces or urges the lower housing downward (relative to the output gear and base) during electric folding from park to drive. As can be seen with reference to C in FIG. 18, a tab or detent structure of the resilient element 36 engages a tab or detent structure of the lower housing when the lower housing (and mirror head) reaches the extended or drive position, thereby stalling the motor.

Figure 20:
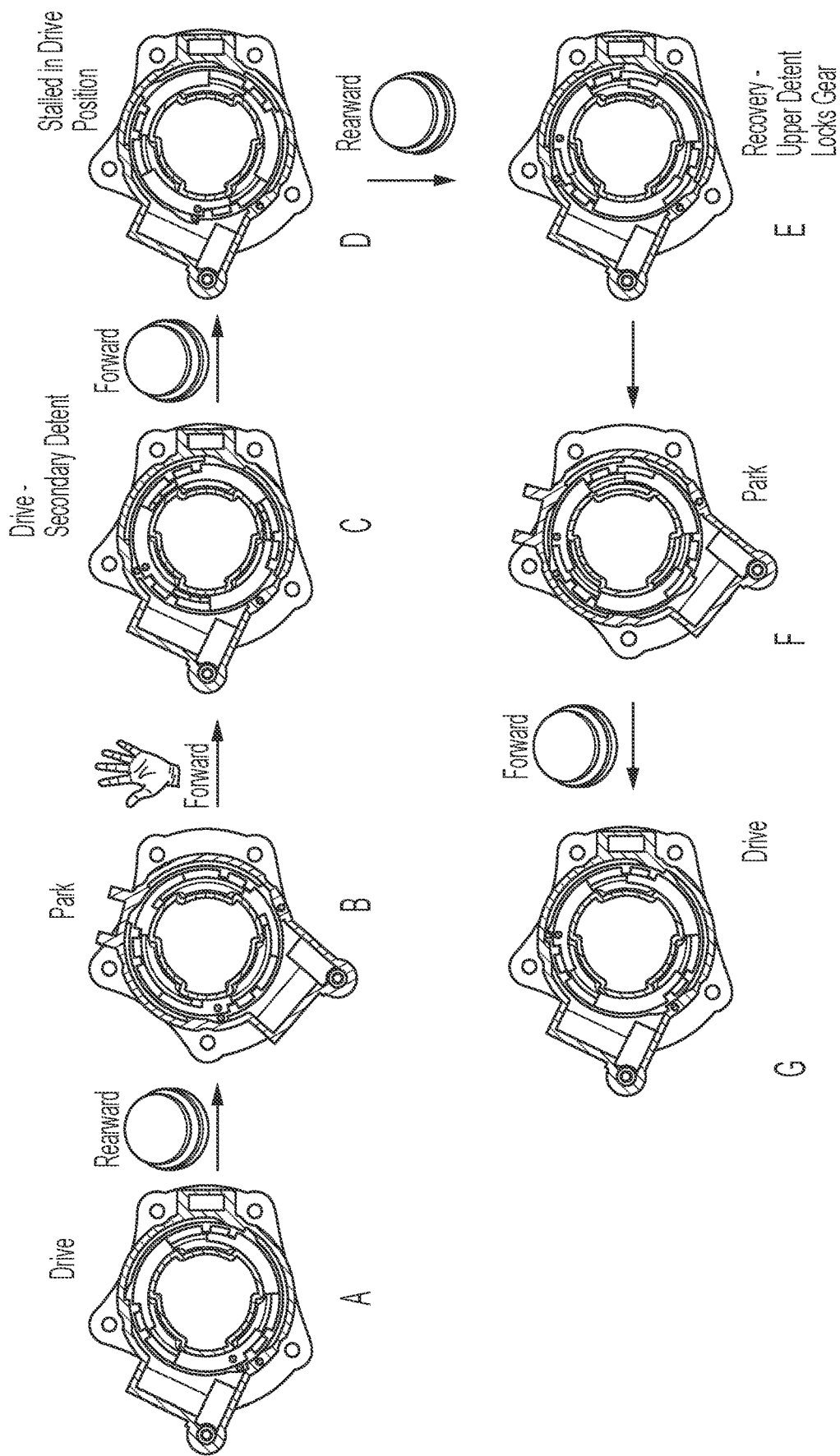
FIG. 20 shows plan views of the actuator when the secondary detent is engaged by manually pivoting the mirror from the park position to the drive position.
Figure 21:
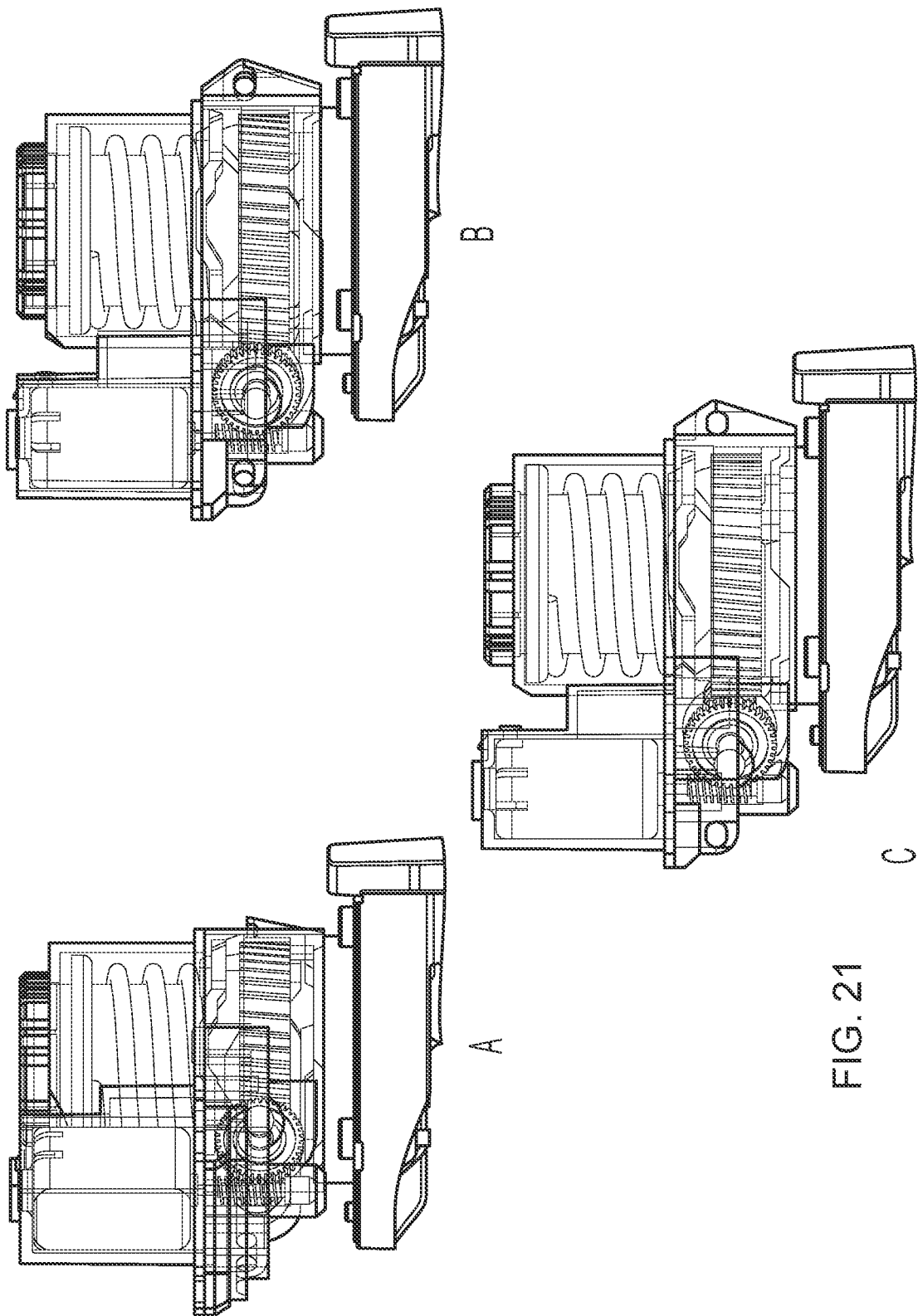
FIG. 21 shows side views of the actuator when operated with the secondary detent engaged.

FIGS. 20 and 21 show operation of the mirror when the actuator is power driven from the drive position to the park position (see A and B in FIG. 20) and then manually pivoted from the park position to the drive position (see C in FIG. 20 and A-C in FIG. 21). Actuation of the mirror actuator to pivot the mirror head from the drive position to the park position initially moves the output gear relative to the upper detent to cause the upper surface of the output gear to ride up the ramps of the upper detent, and then the lower detent surface of the lower housing rides up the ramps of the base to lift the housing and mirror head relative to the base and mounting arm and then the mirror head is pivoted to the park position (with the desired gap at the cutline seal).

As the mirror head is manually pivoted from the park position toward the drive position, the upper detent is lifted (via the ramped upper surface of the output gear and the ramped surface of the upper detent) and disengaged from the base, and the mirror head and lower housing 28 and output gear 26 rotate together relative to the base 22 and the upper detent 32. As the mirror head arrives at the drive position, the lower housing and output gear lower or drop to engage the lower detent of the base 22 (but the upper detent of the output gear is not received in the recess of the upper detent). The mirror head thus moves from the park position to the secondary detent drive position (via manual folding of the mirror head). When the mirror head is manually pivoted toward the drive position, the lower housing 28 rotates with the output gear 26 with respect to the base 22 and upper detent 32, and the upper detent surface of the output gear 26 climbs the ramps of the detent surface of the upper detent 32, pushing the upper detent 32 away from the base 22.

The next time the electrically-operated actuator is actuated or electrically powered (via actuation of a user input in the vehicle), the actuator will attempt to pivot the mirror head from the park position to the drive position, even though the mirror head is already in the drive position. As shown at D in FIG. 20, this causes the output gear to rotate until the motor is stalled with the mirror head still in the drive position or in the forward position. A second actuation of the user input will cause the actuator to pivot the mirror head from the drive position or forward position to the park position. This causes the output gear to rotate until the upper detent engages (see E of FIG. 20), and then the lower housing rotates about the output gear to the park position (see F of FIG. 20). Another actuation of the user input pivots the mirror head from the park position to the drive position, where the primary detents are again engaged (but with the output gear and resilient element rotated 120 degrees from where they were relative to the lower housing when the mirror head was initially at the drive position and before the manual pivoting of the mirror head).

The secondary detent functions when the mirror is electrically folded into the park position and then manually folded back to the drive position. While both the upper and lower detents are active in the primary detent function (during powerfolding of the mirror head), only the lower detent interface is active in the secondary detent function (when manually folding the mirror head). To return to the primary detent, the output gear 26 must be driven until it finds the upper detent interface. While the output gear 26 is searching for the upper detent 32 it climbs the ramps located on the ramp interface.

Figure 22:
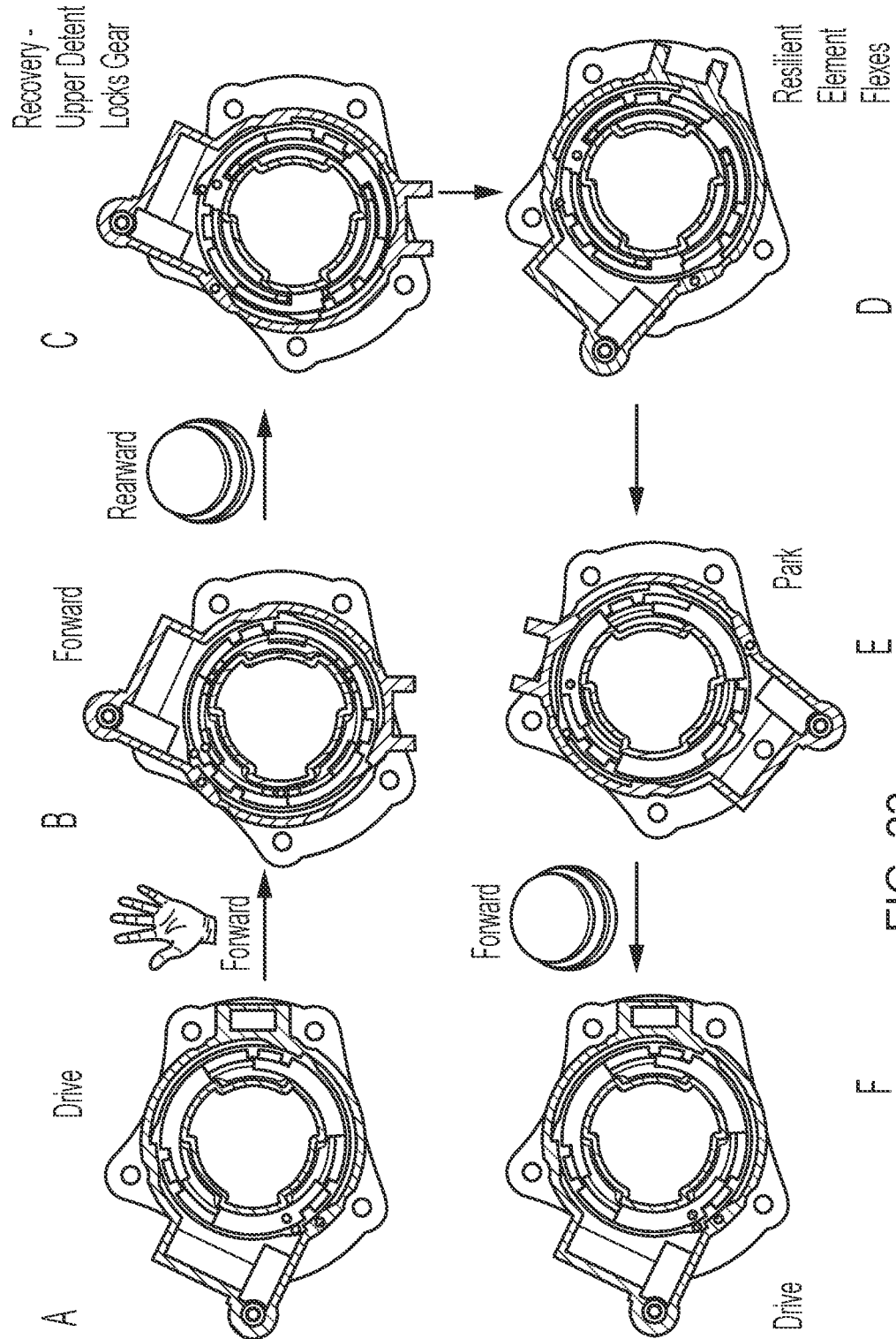
FIG. 22 shows plan views of the actuator when the mirror is manually folded forward and then the motor is operated to pivot the mirror to the park position and then the drive position.
Figure 23:
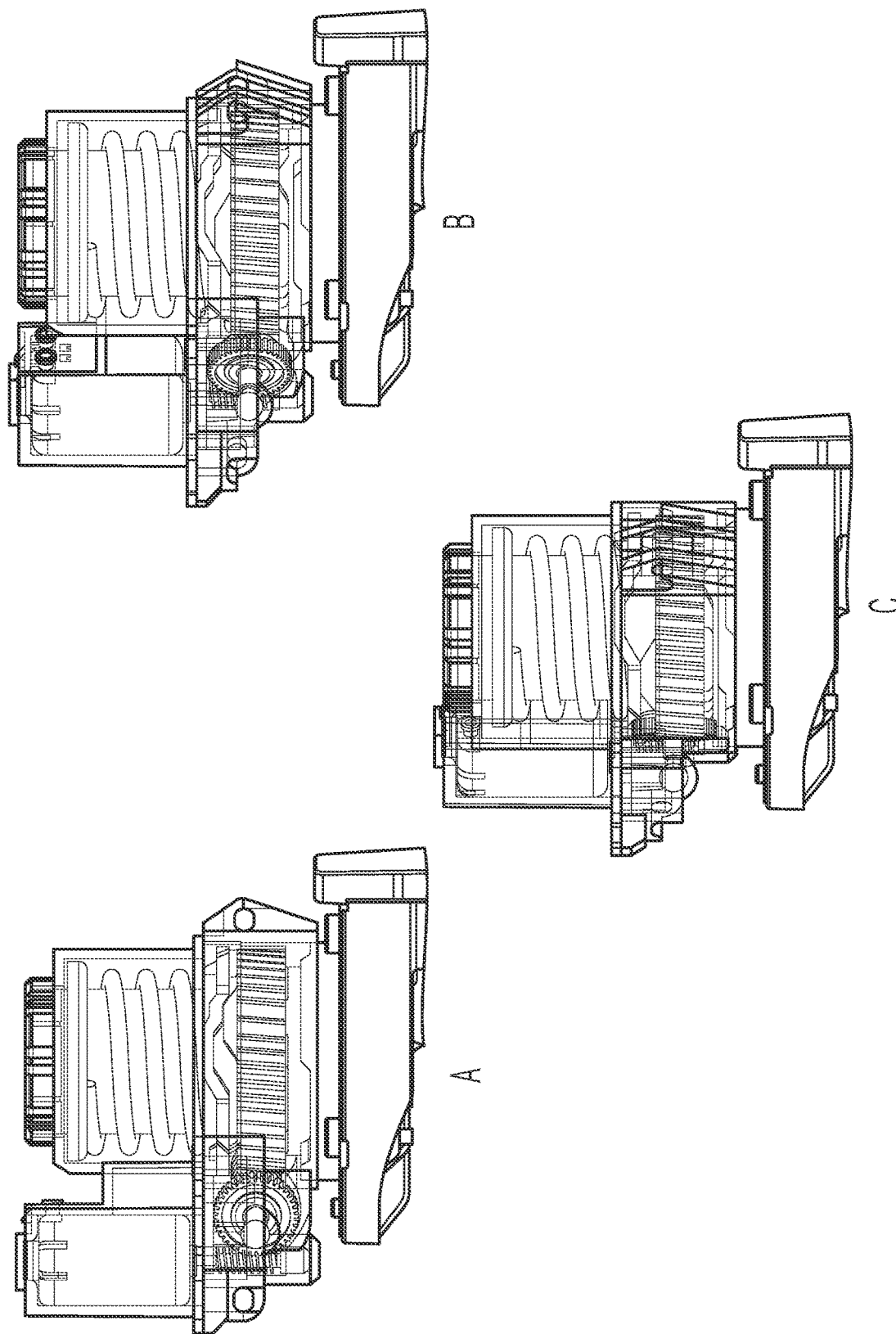
FIG. 23 shows side views of the actuator during manual folding of the mirror to the forward position.

Similarly, when the mirror head is in the drive position and manually pivoted to the forward position, the lower housing portion and output gear are rotated until the mirror head is in the forward position (see A and B in FIG. 22 and A-C in FIG. 23). The upper detent is disengaged when in the forward position. When the actuator is actuated (to pivot the mirror head rearward), the output gear rotates until the upper detent locks the gear, whereby further rotation causes the lower housing and mirror head to rotate rearward toward the drive position. As the mirror head rotates, the resilient element flexes (see D in FIG. 22) due to the angled leading edge of the tab of the resilient element engaging a corresponding angled edge of the lower housing while the tab is at a gap of the lower part of the output gear (to allow for radial inward flexing of the resilient element at that location), to allow the mirror head to continue pivoting past the drive position to the rearward position (the motor will continue to operate until it is stalled). When stopped in the park position (see E of FIG. 22), the next actuation of the actuator will pivot the mirror head back to the drive position where the upper and lower detents will properly engage the output gear and lower housing to retain the mirror head in the drive position.

Similarly, when the mirror head is manually folded rearward from the drive position to the park position (see A and B in FIG. 24 and A-C in FIG. 25), the next actuation of the actuator will cause the actuator to try to rotate the mirror head rearward. When that happens (see C in FIG. 24), the upper detent locks the output gear and stalls the motor with the mirror head still in the park position. The motor is stalled due to the spring force acting at the upper detent and the spring load going through the upper detent to the output gear and thus limiting the ability of the upper surface of the output gear to move along the ramped surface of the upper detent when the upper surface of the output gear is received in the recess of the upper detent. The next actuation of the actuator rotates the mirror head to the drive position (see D in FIG. 24).

Figure 26:
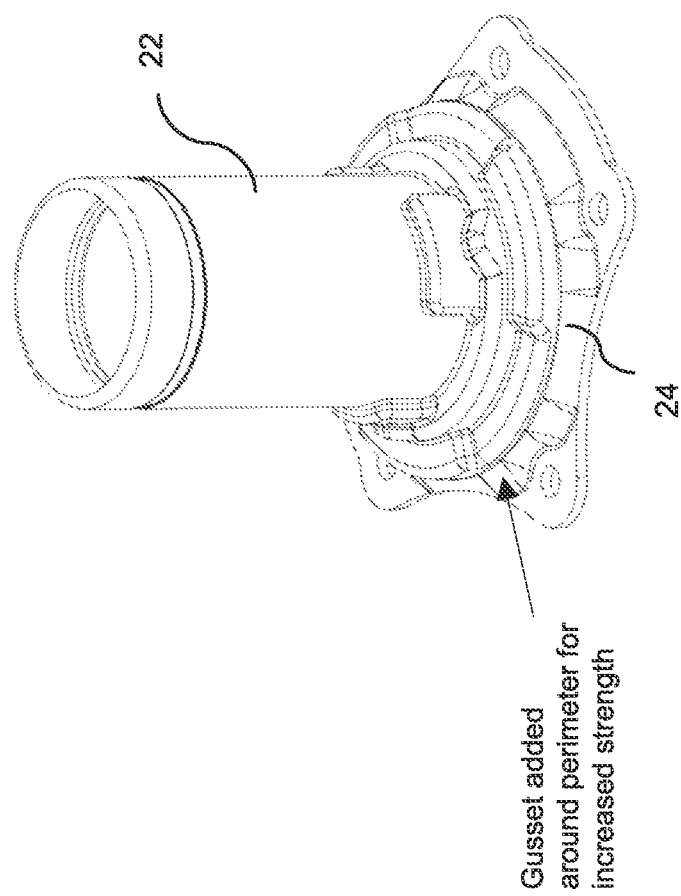
FIG. 26 is a perspective view of the base of the actuator.
Figure 27:
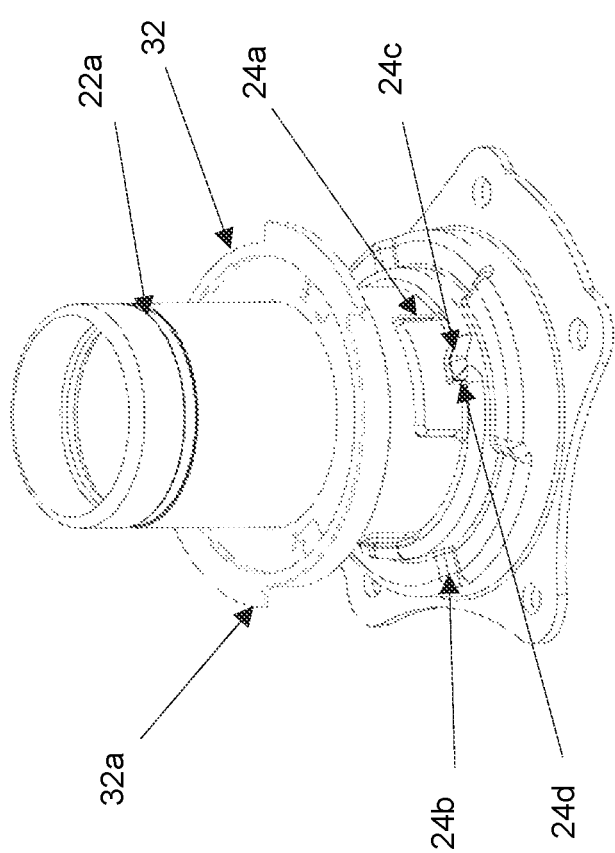
FIG. 27 is another perspective view of the base of the actuator.
Figure 33:
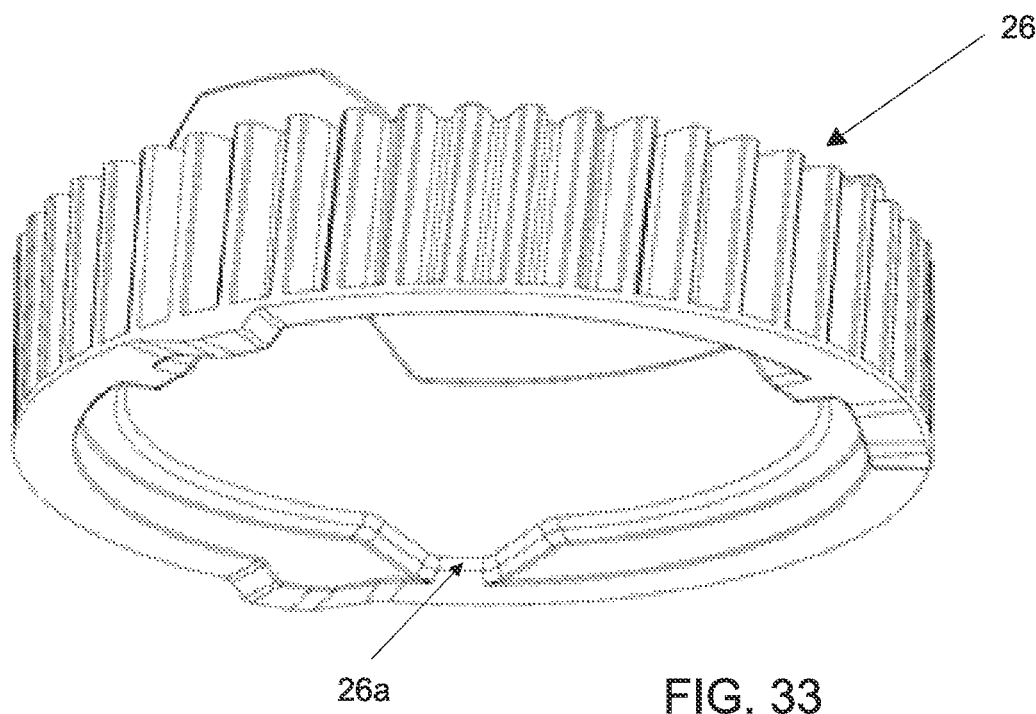
FIG. 33 is a lower perspective view of the output gear.
Figures 34, 35:
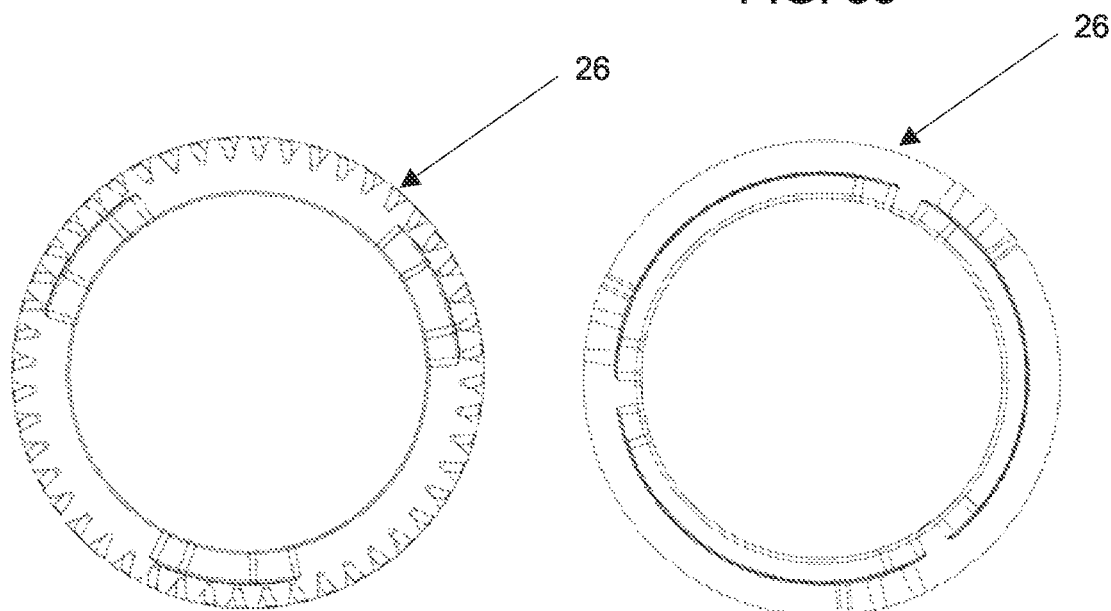
FIG. 34 is a top plan view of the output gear.
FIG. 35 is a bottom plan view of the output gear.

Optionally, and such as shown in FIGS. 26 and 27, the base 24 and post 22 may be notched or keyed (see "key feature" 24a in FIG. 27 that engages a correspondingly formed feature or recess of the upper detent element 32) to rotationally fix the upper detent 32 in place in relation to the post 22 (while allowing for longitudinal movement of the upper detent along the post). The base 24 has helical detents 24b (lower detents) to achieve uniform surface contact with the upper detent or lower housing. The base has a ramp 24c that lifts the output gear during electric folding. The ramp 24c is engaged by a corresponding ramp or feature 26a at the lower part or bottom of the output gear 26 (see FIGS. 33 and 35). Thus, when the motor is actuated and rotates the output gear at the start of the fold-to-park operation, the output gear is raised upward so that the detent of the upper detent surface of the output gear is received in the second or further recess of the upper detent element, and then, when further operation of the motor occurs, the housing portion begins to rotate about the output gear and raises up by its detent at the lower detent surface sliding upward and out of the recesses at the base detent surface.

The base also has a hard stop 24d that stops the gear and stalls the motor during secondary detent recovery in one direction. As shown in FIGS. 28-30, the base and post comprise separate elements, with the post 22' received through the base 24', and with the base 24' seated at and retained at the lower end of the post 22'.

Figure 13:
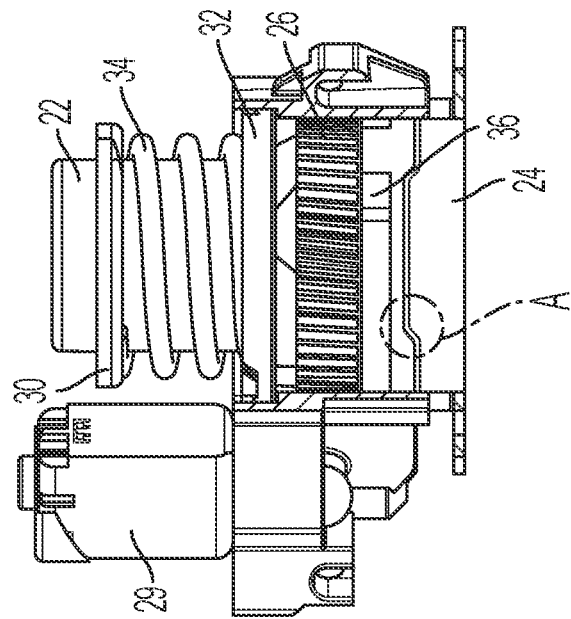
FIG. 13 is a side view of the actuator, shown with the primary detent engaged.
Figure 14:
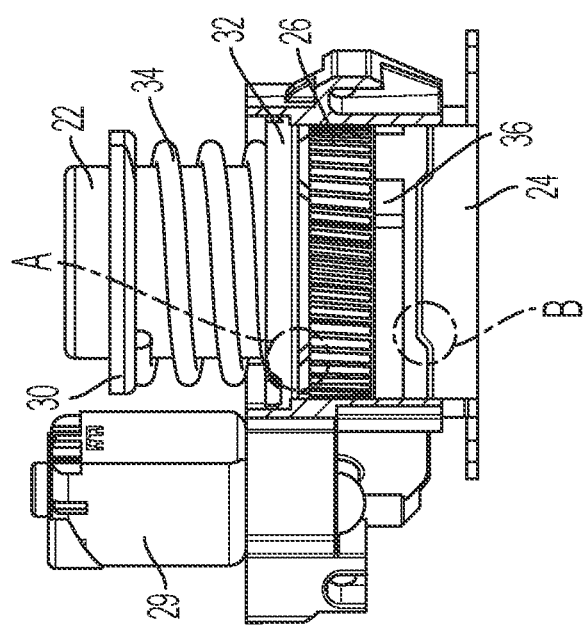
FIG. 14 is another side view of the actuator, shown with the secondary detent engaged.

The actuator provides enhanced performance and capability (reduced noise, higher torque, lift and turn, double detent, and a larger pivot post hole). The actuator has two different detent states that become active after different cycling scenarios known as the "primary" detent state and the "secondary" detent state. The primary detent has both the upper detent (the upper surface of the output gear and the detent surface of the upper detent element, see A in FIG. 13) and the lower detent (the lower surface of the housing portion and the upper detent surface of the base, see B in FIG. 13) engaged, and the secondary detent only has the lower detent (see A in FIG. 14) engaged.

The actuator thus electrically folds rearward from the drive position to the park position and electrically folds forward back to the drive position during normal operation of the motor and without manual pivoting or folding of the mirror head. During powered or electric folding from the drive position toward the park position, the output gear releases 1.5 mm upwards (or other amount depending on the particular application), changing the path of the spring load path directly to the base, allowing the lower housing to lift without spring load. The lower housing rides up the lower detent ramps on the base to provide 1.5 mm of lift (or other amount of lift depending on the particular application). The lower detent ramps are designed to allow constant surface contact between the lower housing and base while in contact. There is no spring load on the lower housing as it climbs the lower detent ramps under normal electric folding conditions. This is due to the upper detent bottoming out on the base, which alters the path of the spring load directly to the base.

Upon return to the drive position, the lower housing is forced back down the 1.5 mm ramps by a ramp feature protruding from the upper detent part (see FIG. 27). Once the lower housing has lowered, the output gear will lower as well and continue to rotate until the resilient element hits the adjacent detent on the lower housing, stalling the motor. As the output gear cinches, the upper detent part lifts a small amount off the base, changing the path of the spring load through the output gear and lower housing.

Thus, when the motor is cinched, the spring load is transferred through the output gear and through the lower housing to the base. During electric folding of the mirror head, the spring load is transferred directly to the base.

Figure 24:
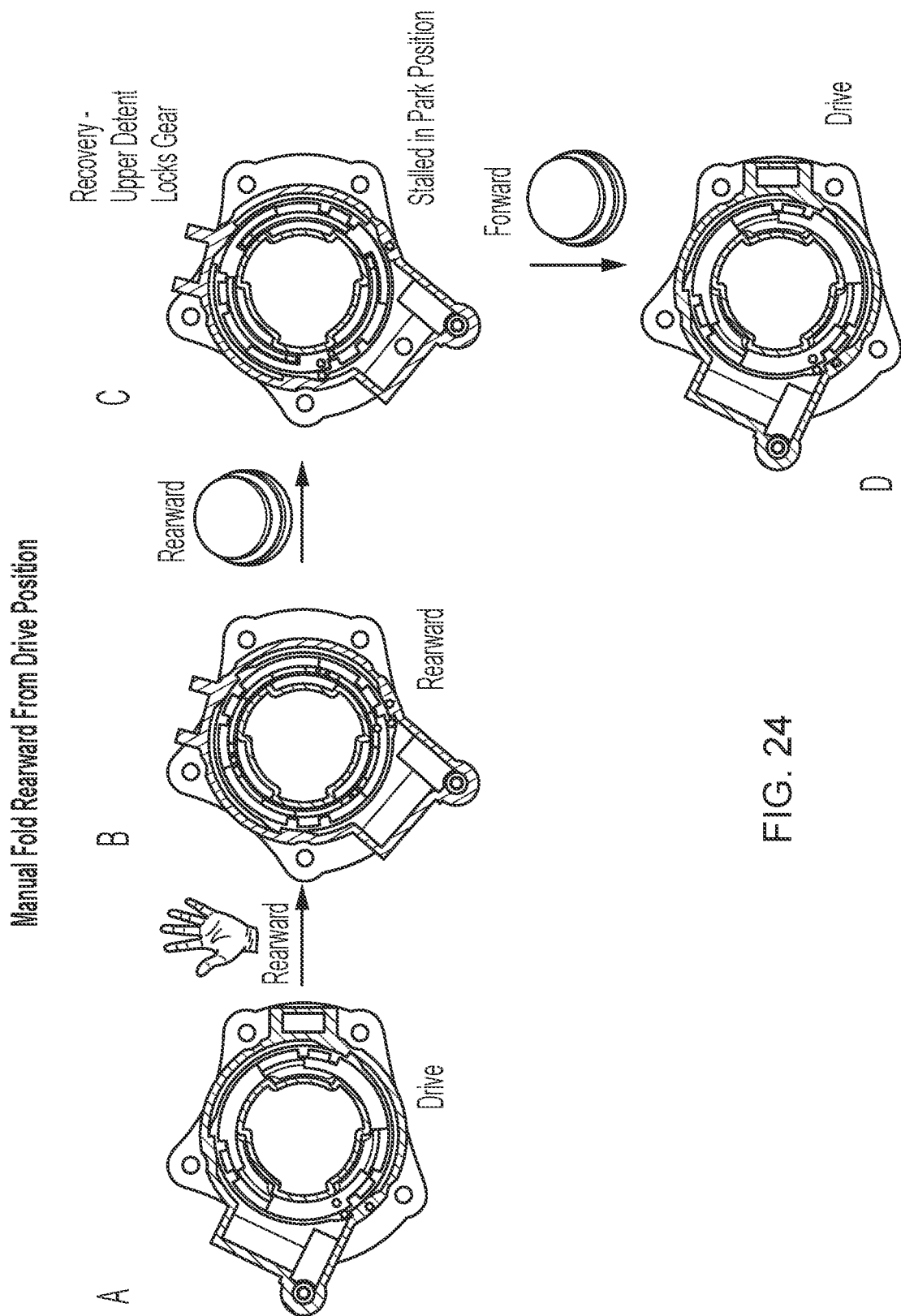
FIG. 24 shows plan views of the actuator when the mirror is manually folded rearward and then the motor is operated to pivot the mirror to the drive position.
Figure 25:
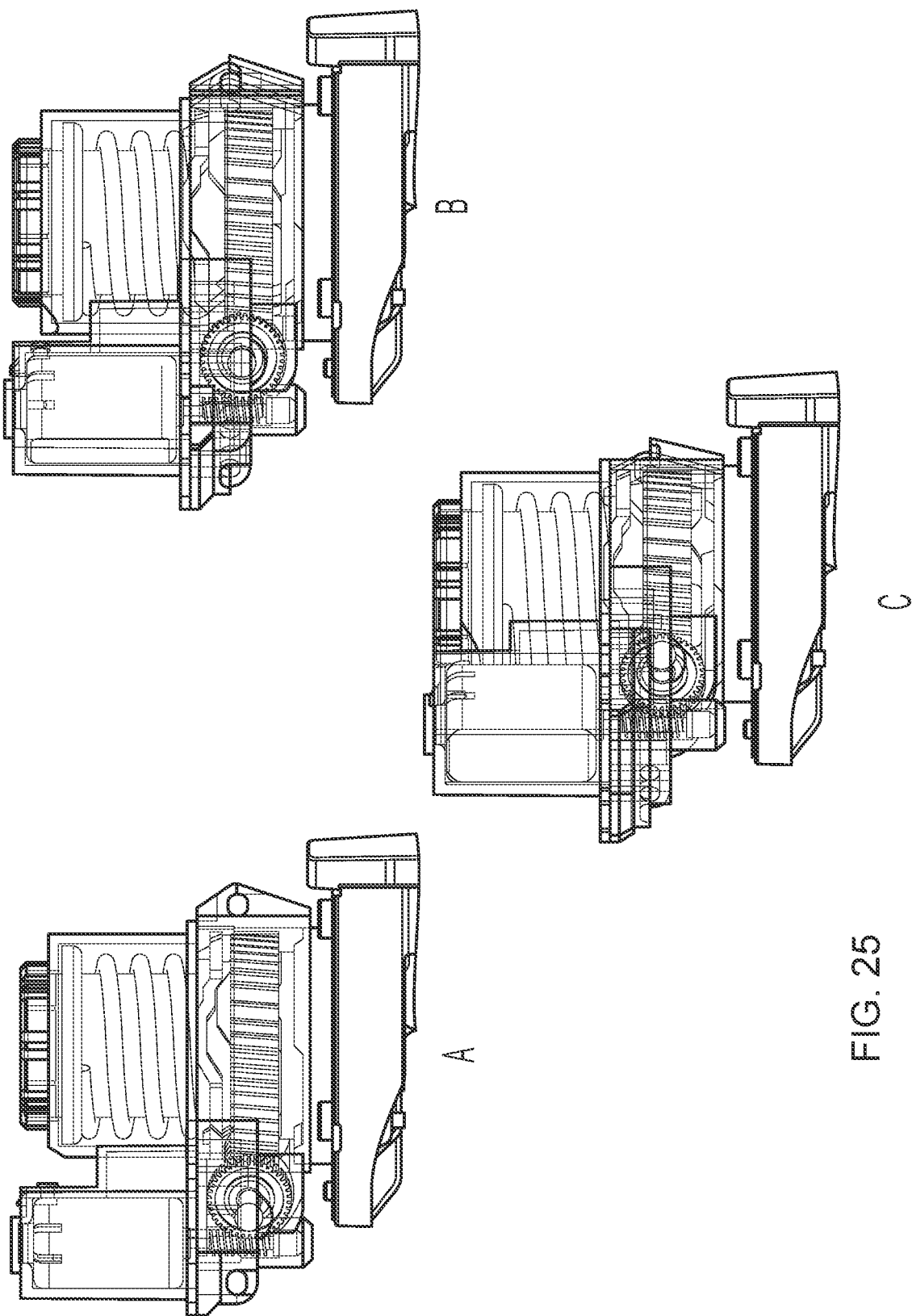
FIG. 25 shows side views of the actuator during manual folding of the mirror rearward.

FIGS. 24 and 25 show the actuator manually folding to the rearward mirror position and FIGS. 22 and 23 show the actuator manually folding to the forward mirror position. The output gear and lower housing move together during any manual folding operation. During manually folding rearward, both the lower and upper detents break at the same time. During manually folding forward, at first only the lower detent breaks, followed by a second upper detent after a small amount of rotational travel.

The actuator provides a secondary detent when the mirror head is manually pivoted from the park position to the drive position. FIGS. 20 and 21 show the cycling sequence to get the actuator into the secondary detent state. The secondary detent may be achieved by electrically folding the actuator rearward into park position and then manually folding the mirror head forward to the drive position. While both upper and lower detents are active in the primary detent, only the lower detent interface is active in secondary detent. The spring load is higher in the secondary detent. To return to the primary detent, the output gear must be electrically driven rearward until it finds the upper detent interface.

Thus, the present invention provides a mirror powerfold actuator that has a secondary detent that engages when the primary detent disengages. The secondary detent is thus a separate and distinct detent from the primary detent. A single spring or biasing element or urging element provides the forces to retain the respective detents in place. A resilient element is included that protrudes radially outboard from the output gear to engage tabs or stops at the lower housing portion to assist in stalling the motor at the appropriate locations. The resilient element may flex radially inboard to allow movement of the tabs of the resilient element to avoid stalling the motor at other locations.

During powerfold operation, the primary detent functions to retain the mirror head in the use/drive position, and during manual pivoting of the mirror head (forward or rearward toward and to the use/drive position), the secondary detent functions to retain the mirror head in the use/drive position. When the secondary detent retains the mirror head in the drive position, subsequent powerfolding of the mirror head to the folded position and back to the drive position will cause the mirror head to be retained by the primary detent.

The actuator of the present invention also provides relief at the cut line seal during pivoting of the mirror head. The coil spring applies load through the upper detent part, the output gear, and the lower housing when the mirror head is in the drive position (and retained there via the primary detent). When the mirror head is in the drive position, the housing is at a lower position and the cut line seal is compressed between the mirror head mounting portion and the mounting arm. As the mirror head is pivoted toward the folded position, the output gear lifts relative to the mounting arm and then the housing lifts away from the cut line seal to increase the gap and to release pressure at the cut line seal. The mirror head thus lifts slightly to release pressure at the seal, so there are reduced forces at the seal during pivotal movement of mirror head. The actuator of the present invention also allows for such lifting of the housing and the mirror head without compressing the coil spring so that less work is required from the motor. This is done via the ramped surfaces so the housing moves up the ramp of the base and the output gear moves up the ramp of the upper detent.

Accordingly, the vehicular exterior rearview mirror assembly includes (i) a mounting arm having a first end configured for attachment at a side of a vehicle and a second end distal from the first end, (ii) a mirror head pivotally mounted at the second end of the mounting arm, with the mirror head comprising a mirror casing and a reflective element, and (iii) a powerfold actuator. The powerfold actuator comprises an electrically operable motor that, when electrically operated, pivots the mirror head relative to the mounting arm between at least the folded position and the drive position. The powerfold actuator comprises a pivot assembly that includes a pivot post and a base portion fixed relative to the pivot post and fixed relative to the mounting arm (with the pivot post protruding upward from the distal end region of the mounting arm and establishing a pivot axis for the mirror head). The base portion has a base detent surface (such as a ramped surface that circumscribes the pivot post at the base portion. The actuator further includes an output gear that circumscribes the pivot post and that has an upper detent surface and a lower detent surface, with the upper and lower detent surfaces comprising respective ramped surfaces. The actuator further includes a housing portion (such as a lower housing portion of a housing of the actuator) attached at the mirror head and having an upper detent surface and a lower detent surface, with the upper and lower detent surfaces circumscribing the pivot post and comprising respective ramped surfaces. The actuator further includes an upper detent element that receives the pivot post therethrough and that has a detent surface that is established (as a ramped surface) at a lower facing part of an upper radially protruding portion of the upper detent. A spring element is disposed between an upper surface of the upper detent element and an upper end of the post (such as at a radially protruding ring that is received in a groove or channel at least partially around the upper end region of the post or that is welded or otherwise affixed at the upper end region of the post. The spring element exerts a biasing force downward to urge the upper detent element downward toward the base portion.

The electrically operable motor is disposed at the housing portion and is operable (when the motor is electrically powered or operated) to rotatably drive a gear (such as a worm gear or the like affixed at an output shaft of the motor) that is engaged with the output gear to pivot the housing portion relative to the output gear and the pivot post (to cause the housing portion and the mirror head to move or rotate or pivot about the pivot axis defined by the longitudinal axis of the pivot post).

The powerfold actuator comprises an upper detent interface, a lower detent interface and a ramp interface. The upper detent interface comprises part of the upper detent surface of the output gear engaging a correspondingly formed part of the lower detent surface of the upper detent element. The lower detent interface comprises part of the lower detent surface of the housing portion engaging a correspondingly formed part of the base detent surface of the base portion. The ramp interface comprises part of the lower detent surface of the output gear engaging the upper detent surface of the housing portion. The engagement of the surfaces allows for rotational movement of the components relative to one another while also providing raising and lowering of the output gear and/or housing portion relative to the pivot tube and base portion to achieve a gap between the mirror head and mounting arm and/or to provide different spring load paths to assist in retaining the mirror head in one of its set positions (e.g., the drive position or the park position).

The powerfold actuator comprises or provides a primary detent that is engaged to maintain the mirror head at the drive position when the mirror head is pivoted via the powerfold actuator to the drive position. The primary detent comprises engagement of the upper detent interface and the lower detent interface at locations where the interfaces limit rotational or pivotal movement of the output gear relative to the upper detent and pivot tube and rotational or pivotal movement of the housing portion relative to the base portion of the pivot tube.

The powerfold actuator also comprises or provides a secondary detent that is engaged to maintain the mirror head at the drive position when the mirror head is manually pivoted to the drive position (such as after the mirror head is electrically pivoted via the powered actuator to the park position). The secondary detent comprises engagement of the lower detent interface at locations where the lower detent interface limits rotational or pivotal movement of the housing portion relative to the base portion of the pivot tube. When the secondary detent is engaged, the actuator does not provide for engagement of the upper detent interface at locations where the upper detent interface limits rotational or pivotal movement of the output gear relative to the upper detent and pivot tube. In other words, following pivoting via the powerfold actuator of the mirror head to the folded position, when the mirror head is manually pivoted from the folded position to the drive position, the primary detent is disengaged and the secondary detent is engaged to maintain the mirror head at the drive position.

The upper detent element is non-rotatably disposed at the pivot post and is longitudinally movable along the pivot post. The upper detent surface of the output gear comprises ramped surfaces that movably engage ramped surfaces of the lower detent surface of the upper detent element. The lower detent surface of the housing portion comprises ramped surfaces that movably engage ramped surfaces of the base detent surface of the base portion. The lower detent surface of the output gear comprises ramped surfaces that movably engage ramped surfaces of the upper detent surface of the housing portion.

When the electrically operable motor is electrically operated to pivot the mirror head between the folded position and the drive position, the lower detent surface of the housing portion moves along the base detent surface of the base portion. Both of these surfaces comprise ramped surfaces, such that movement of one relative to the other results in raising or lowering of the housing portion relative to the base portion, and also results in engagement of surfaces that, when the spring load is through the housing portion to the base portion, resists or limits movement of the housing portion relative to the base portion to retain the mirror head in that position. As the mirror head moves from the folded position toward the drive position and as the lower detent surface of the housing portion begins to move along the ramped base detent surface of the base portion, the housing portion moves upward relative to the base portion to raise the mirror head relative to the mounting arm.

Also, as the powerfold actuator pivots the mirror head between the folded position and the drive position, the upper detent surface of the output gear moves along the lower detent surface of the upper detent element and the output gear moves upward relative to the base portion and the upper detent element, and the upper detent element is not raised with the housing portion and output gear such that the spring element is not compressed further. The housing portion and the output gear move upward relative to the base portion to provide a gap (such as a gap of, for example, at least 1 mm, or such as at least 1.5 mm, or such as at least 2 mm) between the mirror head and the mounting arm as the mirror head is pivoted between the folded position and the drive position. As the output gear moves upward relative to the base portion, a portion of the detent surface of the output gear is received in a recessed portion of the lower detent surface of the upper detent element such that the upper detent element is not raised and remains in contact with the base portion (with the spring force path being directly to the base portion through and along the upper detent element).

When the mirror head is manually pivoted (such as from the drive position to the park position or such as from the park position to the drive position), the output gear and the housing portion pivot together relative to the pivot tube and the base portion. When the mirror head is manually pivoted, the housing portion and the output gear move upward relative to the base portion and the upper detent element is urged upward against the spring element, which provides a gap between the mirror head and the mounting arm to reduce or eliminate compression of the cutline seal during such pivoting movement.

The powerfold actuator may further comprise a resilient element that circumscribes part of the output gear (such as at a lower part of the output gear). The resilient element has a radially protruding tab that engages a corresponding tab at the housing portion to limit rotation of the housing portion relative to the output gear to stall the motor at stop locations. The output gear and resilient element are formed and arranged so that the resilient element flexes radially inboard to allow movement of the tabs of the resilient element at other locations to avoid stalling the motor at other locations separate from the stop locations.

When the electrically operable motor is cinched to stop pivotal movement of the housing portion relative to the output gear, the spring load path for the spring element is through the output gear, the housing portion and the base portion. When the electrically operable motor is operating to rotate the housing portion relative to the output gear, the spring load path for the spring element is through the upper detent element and directly to the base portion due to the upper detent element engaging the base portion.

Changes and modifications in the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, the vehicular exterior rearview mirror assembly comprising:
   a mounting arm having a first end configured for attachment at a side of a vehicle and a second end distal from the first end;
   a mirror head pivotally mounted at the second end of the mounting arm, wherein the mirror head comprises a reflective element;
   a powerfold actuator;
   wherein the powerfold actuator comprises a housing portion attached at the mirror head and a base portion attached at the mounting arm, the base portion including a base detent that circumscribes a pivot post of the base portion;
   wherein the powerfold actuator comprises a spring element disposed between an upper detent of an upper detent element and an upper end of the pivot post, the spring element urging the upper detent element toward the base detent of the base portion;
   wherein the upper detent element is non-rotatably disposed at the pivot post and is longitudinally movable along the pivot post;
   wherein the housing portion of the powerfold actuator houses an electrically operable motor, and wherein the powerfold actuator, when the electrically operable motor is electrically operated, pivots the mirror head relative to the mounting arm between at least a folded position where the mirror head is along a side of the vehicle and an extended position where the mirror head extends outward from the side of the vehicle;
   wherein the powerfold actuator comprises an upper detent interface and a lower detent interface;
   wherein the upper detent interface comprises part of an upper detent of an output gear of the powerfold actuator engaging a correspondingly formed part of a lower detent of the upper detent element;

wherein the output gear is disposed between the upper detent of the upper detent element and the upper end of the pivot post, the output gear circumscribing the pivot post;

wherein the lower detent interface comprises part of a lower detent of the housing portion engaging a correspondingly formed part of the base detent of the base portion;

wherein the powerfold actuator comprises a primary detent that (i) uses the upper detent interface and (ii) uses the lower detent interface to maintain the mirror head at the extended position when the mirror head is pivoted via the powerfold actuator to the extended position;

wherein the powerfold actuator comprises a secondary detent that (i) uses the lower detent interface and (ii) does not use the upper detent interface to maintain the mirror head at the extended position when the mirror head is manually pivoted to the extended position;

wherein, when the mirror head is manually pivoted from the folded position to the extended position, the primary detent is disengaged and the secondary detent is engaged to maintain the mirror head at the extended position; and wherein, when the powerfold actuator, with the electrically operable motor being electrically operated, pivots the mirror head to engage the primary detent, part of a lower detent of the output gear engages an upper detent of the housing portion.

2. The vehicular exterior rearview mirror assembly of claim 1, wherein, when the powerfold actuator, with the electrically operable motor being electrically operated, pivots the mirror head between the folded position and the extended position, the lower detent of the housing portion moves along the base detent of the base portion.

3. The vehicular exterior rearview mirror assembly of claim 2, wherein, when the powerfold actuator, with the electrically operable motor being electrically operated, pivots the mirror head from the folded position toward the extended position and as the lower detent of the housing portion begins to move along the base detent of the base portion, the housing portion moves upward relative to the base portion to raise the mirror head relative to the mounting arm.

4. The vehicular exterior rearview mirror assembly of claim 2, wherein, when the powerfold actuator, with the electrically operable motor being electrically operated, pivots the mirror head between the folded position and the extended position, the upper detent of the output gear moves along the lower detent of the upper detent element and the output gear moves upward relative to the base portion and the upper detent element, and the upper detent element is not raised with the housing portion and the output gear such that the spring element is not compressed further.

5. The vehicular exterior rearview mirror assembly of claim 4, wherein the housing portion and the output gear move upward relative to the base portion to provide a gap between the mirror head and the mounting arm as the mirror head is pivoted between the folded position and the extended position.

6. The vehicular exterior rearview mirror assembly of claim 5, wherein the housing portion and the output gear move upward at least 1.5 mm relative to the base portion to provide the gap between the mirror head and the mounting arm as the mirror head is pivoted between the folded position and the extended position.

7. The vehicular exterior rearview mirror assembly of claim 4, wherein, as the output gear moves upward relative to the base portion, a portion of the upper detent of the output gear is received in a recessed portion of the lower detent of the upper detent element such that the upper detent element is not raised and remains in contact with the base portion.

8. The vehicular exterior rearview mirror assembly of claim 1, wherein the powerfold actuator, when the electrically operable motor is electrically operated, pivots the housing portion relative to the output gear.

9. The vehicular exterior rearview mirror assembly of claim 8, wherein, when the mirror head is manually pivoted, the output gear and the housing portion pivot together relative to the base portion.

10. The vehicular exterior rearview mirror assembly of claim 9, wherein, when the mirror head is manually pivoted, the housing portion and the output gear move upward relative to the base portion and the upper detent element is urged upward against the spring element.

11. The vehicular exterior rearview mirror assembly of claim 1, wherein the powerfold actuator comprises a resilient element at the output gear, the resilient element having a radially protruding tab that engages a corresponding tab at the housing portion to limit rotation of the housing portion relative to the output gear to stall the electrically operable motor at stop locations, and wherein the resilient element flexes radially inboard to allow movement of the radially protruding tab of the resilient element to avoid stalling the electrically operable motor at other locations separate from the stop locations.

12. The vehicular exterior rearview mirror assembly of claim 1, wherein, when the powerfold actuator, with the electrically operable motor being electrically operated, pivots the mirror head, and when the electrically operable motor is cinched to stop pivotal movement of the mirror head, a spring load path for the spring element is through the output gear, the housing portion and the base portion.

13. The vehicular exterior rearview mirror assembly of claim 1, wherein, when the powerfold actuator, with the electrically operable motor being electrically operated, pivots the mirror head, a spring load path for the spring element is directly to the base portion due to the upper detent element engaging the base portion.

14. The vehicular exterior rearview mirror assembly of claim 1, wherein the upper detent of the output gear comprises ramped surfaces that movably engage ramped surfaces of the lower detent of the upper detent element, and wherein the lower detent of the housing portion comprises ramped surfaces that movably engage ramped surfaces of the base detent of the base portion, and wherein the lower detent of the output gear comprises ramped surfaces that movably engage ramped surfaces of the upper detent of the housing portion.

15. A vehicular exterior rearview mirror assembly, the vehicular exterior rearview mirror assembly comprising:
a mounting arm having a first end configured for attachment at a side of a vehicle and a second end distal from the first end;
a mirror head pivotally mounted at the second end of the mounting arm, wherein the mirror head comprises a reflective element;
a powerfold actuator;
wherein the powerfold actuator comprises a housing portion attached at the mirror head and a base portion attached at the mounting arm, the base portion including a base detent that circumscribes a pivot post of the base portion;

wherein the powerfold actuator comprises a spring element disposed between an upper detent of an upper detent element and an upper end of the pivot post, the spring element urging the upper detent element toward the base detent of the base portion;

wherein the upper detent element is non-rotatably disposed at the pivot post and is longitudinally movable along the pivot post;

wherein the housing portion of the powerfold actuator houses an electrically operable motor, and wherein the powerfold actuator, when the electrically operable motor is electrically operated, pivots the mirror head relative to the mounting arm between at least a folded position where the mirror head is along a side of the vehicle and an extended position where the mirror head extends outward from the side of the vehicle;

wherein the powerfold actuator comprises an upper detent interface and a lower detent interface;

wherein the upper detent interface comprises part of an upper detent of an output gear of the powerfold actuator engaging a correspondingly formed part of a lower detent of the upper detent element;

wherein the output gear is disposed between the lower detent of the upper detent element and the upper end of the pivot post, the output gear circumscribing the pivot post;

wherein the powerfold actuator, when the electrically operable motor is electrically operated, pivots the housing portion relative to the output gear;

wherein the lower detent interface comprises part of a lower detent of the housing portion engaging a correspondingly formed part of the base detent of the base portion;

wherein the powerfold actuator comprises a primary detent that (i) uses the upper detent interface and (ii) uses the lower detent interface to maintain the mirror head at the extended position when the mirror head is pivoted via the powerfold actuator to the extended position;

wherein the powerfold actuator comprises a secondary detent that (i) uses the lower detent interface and (ii) does not use the upper detent interface to maintain the mirror head at the extended position when the mirror head is manually pivoted to the extended position;

wherein, when the mirror head is manually pivoted from the folded position to the extended position, the primary detent is disengaged and the secondary detent is engaged to maintain the mirror head at the extended position;

wherein, when the powerfold actuator, with the electrically operable motor being electrically operated, pivots the mirror head to engage the primary detent, part of a lower detent of the output gear engages an upper detent of the housing portion; and wherein, when the powerfold actuator, with the electrically operable motor being electrically operated, pivots the mirror head between the folded position and the extended position, the upper detent of the output gear moves along the lower detent of the upper detent element and the output gear moves upward relative to the base portion and the upper detent element, and the upper detent element is not raised with the housing portion and the output gear such that the spring element is not compressed further.

16. The vehicular exterior rearview mirror assembly of claim 15, wherein, when the powerfold actuator, with the electrically operable motor being electrically operated, pivots the mirror head between the folded position and the extended position, the lower detent of the housing portion moves along the base detent of the base portion.

17. The vehicular exterior rearview mirror assembly of claim 16, wherein, when the powerfold actuator, with the electrically operable motor being electrically operated, pivots the mirror head from the folded position toward the extended position and as the lower detent of the housing portion begins to move along the base detent of the base portion, the housing portion moves upward relative to the base portion to raise the mirror head relative to the mounting arm.

18. The vehicular exterior rearview mirror assembly of claim 15, wherein the housing portion and the output gear move upward relative to the base portion to provide a gap between the mirror head and the mounting arm as the mirror head is pivoted between the folded position and the extended position.

19. The vehicular exterior rearview mirror assembly of claim 15, wherein, as the output gear moves upward relative to the base portion, a portion of the upper detent of the output gear is received in a recessed portion of the lower detent of the upper detent element such that the upper detent element is not raised and remains in contact with the base portion.

20. The vehicular exterior rearview mirror assembly of claim 15, wherein, when the powerfold actuator, with the electrically operable motor being electrically operated, pivots the mirror head, and when the electrically operable motor is cinched to stop pivotal movement of the mirror head, a spring load path for the spring element is through the output gear, the housing portion and the base portion, and wherein, when the powerfold actuator, with the electrically operable motor being electrically operated, pivots the mirror head, the spring load path for the spring element is directly to the base portion due to the upper detent element engaging the base portion.

21. A vehicular exterior rearview mirror assembly, the vehicular exterior rearview mirror assembly comprising:

a mounting arm having a first end configured for attachment at a side of a vehicle and a second end distal from the first end;

a mirror head pivotally mounted at the second end of the mounting arm, wherein the mirror head comprises a reflective element;

a powerfold actuator;

wherein the powerfold actuator comprises a housing portion attached at the mirror head and a base portion attached at the mounting arm, the base portion including a base detent that circumscribes a pivot post of the base portion;

wherein the powerfold actuator comprises a spring element disposed between an upper detent of an upper detent element and an upper end of the pivot post, the spring element urging the upper detent element toward the base detent of the base portion;

wherein the upper detent element is non-rotatably disposed at the pivot post and is longitudinally movable along the pivot post;

wherein the housing portion of the powerfold actuator houses an electrically operable motor, and wherein the powerfold actuator, when the electrically operable motor is electrically operated, pivots the mirror head relative to the mounting arm between at least a folded position where the mirror head is along a side of the vehicle and an extended position where the mirror head extends outward from the side of the vehicle;

wherein the powerfold actuator comprises an upper detent interface and a lower detent interface;

wherein the upper detent interface comprises part of an upper detent of an output gear of the powerfold actuator engaging a correspondingly formed part of a lower detent of the upper detent element;

wherein the output gear is disposed between the lower detent of the upper detent element and the upper end of the pivot post, the output gear circumscribing the pivot post;

wherein the powerfold actuator, when the electrically operable motor is electrically operated, pivots the housing portion relative to the output gear;

wherein, when the mirror head is manually pivoted, the output gear and the housing portion pivot together relative to the base portion;

wherein the lower detent interface comprises part of a lower detent of the housing portion engaging a correspondingly formed part of the base detent of the base portion;

wherein the powerfold actuator comprises a primary detent that (i) uses the upper detent interface and (ii) uses the lower detent interface to maintain the mirror head at the extended position when the mirror head is pivoted via the powerfold actuator to the extended position;

wherein the powerfold actuator comprises a secondary detent that (i) uses the lower detent interface and (ii) does not use the upper detent interface to maintain the mirror head at the extended position when the mirror head is manually pivoted to the extended position;

wherein, when the mirror head is manually pivoted from the folded position to the extended position, the primary detent is disengaged and the secondary detent is engaged to maintain the mirror head at the extended position;

wherein, when the powerfold actuator, with the electrically operable motor being electrically operated, pivots the mirror head to engage the primary detent, part of a lower detent of the output gear engages an upper detent of the housing portion;

wherein, when the powerfold actuator, with the electrically operable motor being electrically operated, pivots the mirror head, a spring load path for the spring element is directly to the base portion due to the upper detent element engaging the base portion; and wherein, when the electrically operable motor of the powerfold actuator is cinched to stop pivotal movement of the mirror head, the spring load path for the spring element is through the output gear, the housing portion and the base portion.

22. The vehicular exterior rearview mirror assembly of claim 21, wherein, when the powerfold actuator, with the electrically operable motor being electrically operated, pivots the mirror head between the folded position and the extended position, the lower detent of the housing portion moves along the base detent of the base portion.

23. The vehicular exterior rearview mirror assembly of claim 22, wherein, when the powerfold actuator, with the electrically operable motor being electrically operated, pivots the mirror head from the folded position toward the extended position and as the lower detent of the housing portion begins to move along the base detent of the base portion, the housing portion moves upward relative to the base portion to raise the mirror head relative to the mounting arm.

24. The vehicular exterior rearview mirror assembly of claim 22, wherein, when the powerfold actuator, with the electrically operable motor being electrically operated, pivots the mirror head between the folded position and the extended position, the upper detent of the output gear moves along the lower detent of the upper detent element and the output gear moves upward relative to the base portion and the upper detent element, and the upper detent element is not raised with the housing portion and the output gear such that the spring element is not compressed further.

25. The vehicular exterior rearview mirror assembly of claim 24, wherein the housing portion and the output gear move upward relative to the base portion to provide a gap between the mirror head and the mounting arm as the mirror head is pivoted between the folded position and the extended position.

\* \* \* \* \*